(12) United States Patent
Nishizawa et al.

(10) Patent No.: US 10,381,943 B2
(45) Date of Patent: Aug. 13, 2019

(54) CAPACITOR MODULE AND POWER CONVERSION DEVICE

(71) Applicant: Hitachi Automotive Systems, Ltd., Hitachinaka-shi, Ibaraki (JP)

(72) Inventors: Youhei Nishizawa, Yokohama (JP); Hideyo Suzuki, Hitachinaka (JP); Masashi Kosuga, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 666 days.

(21) Appl. No.: 14/433,469

(22) PCT Filed: Sep. 30, 2013

(86) PCT No.: PCT/JP2013/076463
§ 371 (c)(1),
(2) Date: Apr. 3, 2015

(87) PCT Pub. No.: WO2014/057824
PCT Pub. Date: Apr. 17, 2014

(65) Prior Publication Data
US 2015/0256096 A1    Sep. 10, 2015

(30) Foreign Application Priority Data

Oct. 9, 2012  (JP) ................................ 2012-223786

(51) Int. Cl.
*H02M 7/00*    (2006.01)
*H01G 2/04*    (2006.01)
(Continued)

(52) U.S. Cl.
CPC ............. *H02M 7/003* (2013.01); *B60L 1/003* (2013.01); *B60L 3/003* (2013.01); *B60L 15/007* (2013.01);
(Continued)

(58) Field of Classification Search
CPC .......... B60L 2240/36; B60L 2240/421; B60L 2240/423; B60L 2240/441;
(Continued)

(56) References Cited

U.S. PATENT DOCUMENTS

2006/0245144 A1* 11/2006 Hozumi ................ H01G 9/016
361/511
2007/0109715 A1   5/2007 Azuma et al.
(Continued)

FOREIGN PATENT DOCUMENTS

JP    9-308267 A    11/1997
JP    2000-152662 A    5/2000
(Continued)

OTHER PUBLICATIONS

International Search Report dated Jan. 14, 2014 with English translation (five (5) pages). 140.00.

*Primary Examiner* — Michael P McFadden
(74) *Attorney, Agent, or Firm* — Crowell & Moring LLP

(57) ABSTRACT

In a power conversion device according to the present invention, a capacitor module, includes a first capacitor element; a second capacitor element; a positive pole-side bus bar; and a negative pole-side bus bar disposed in a laminated state, in which the positive pole-side bus bar and the negative pole-side bus bar are laminated via an insulating member. The first capacitor element includes a first body portion, a first positive pole-side electrode, and a first negative pole-side electrode. The second capacitor element includes a second body portion, a second positive pole-side electrode, and a second negative pole-side electrode. The first capacitor element is disposed so that the first positive pole-side electrode assumes a position closer to the second negative pole-side electrode than to the second positive pole-side electrode and faces the second negative pole-side electrode; and a laminate portion formed with the positive
(Continued)

pole-side bus bar and the negative pole-side bus bar continues up to a point over a space where the first positive pole-side electrode and the second negative pole-side electrode face each other.

12 Claims, 22 Drawing Sheets

(51) Int. Cl.
| | |
|---|---|
| *H01G 4/38* | (2006.01) |
| *H01G 4/228* | (2006.01) |
| *B60L 1/00* | (2006.01) |
| *B60L 3/00* | (2019.01) |
| *B60L 15/00* | (2006.01) |
| *B60L 15/20* | (2006.01) |
| *H02G 5/00* | (2006.01) |
| *H02M 7/537* | (2006.01) |
| *B60L 50/61* | (2019.01) |
| *B60L 50/16* | (2019.01) |
| *B60L 58/12* | (2019.01) |

(52) U.S. Cl.
CPC ........... *B60L 15/2009* (2013.01); *B60L 50/16* (2019.02); *B60L 50/61* (2019.02); *B60L 58/12* (2019.02); *H01G 2/04* (2013.01); *H01G 4/228* (2013.01); *H01G 4/38* (2013.01); *H02G 5/005* (2013.01); *H02M 7/537* (2013.01); *B60L 2210/40* (2013.01); *B60L 2220/14* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2270/145* (2013.01); *Y02T 10/6217* (2013.01); *Y02T 10/645* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/7241* (2013.01); *Y02T 10/7275* (2013.01)

(58) Field of Classification Search
CPC ......... B60L 2240/443; B60L 2270/145; B60L 2210/40; B60L 2220/14; B60L 2240/12; B60L 1/003; B60L 3/003; B60L 11/123; B60L 11/14; B60L 11/1861; B60L 15/007; B60L 15/2009; Y02T 10/6217; Y02T 10/645; H02M 7/003; H02M 7/537; H01G 4/228; H01G 4/38; H02G 5/005
USPC .................................................... 361/329
See application file for complete search history.

(56) References Cited

U.S. PATENT DOCUMENTS

| | | |
|---|---|---|
| 2008/0186751 A1 | 8/2008 | Tokuyama et al. |
| 2010/0025126 A1* | 2/2010 | Nakatsu ................ B60L 11/00 180/65.1 |
| 2010/0188813 A1* | 7/2010 | Nakatsu ................ H02M 7/003 361/689 |
| 2011/0051371 A1 | 3/2011 | Azuma et al. |
| 2011/0249421 A1 | 10/2011 | Matsuo et al. |

FOREIGN PATENT DOCUMENTS

| | | |
|---|---|---|
| JP | 2005-12940 A | 1/2005 |
| JP | 2007-143272 A | 6/2007 |
| JP | 2008-193867 A | 8/2008 |
| JP | 2012-10540 A | 1/2012 |
| WO | WO 2010/016426 A1 | 2/2010 |
| WO | WO 2010/050428 A1 | 5/2010 |

* cited by examiner

CAPACITOR MODULE AND POWER CONVERSION DEVICE

TECHNICAL FIELD

The present invention relates to a power conversion device used to convert DC power to AC power or AC power to DC power and more specifically, it relates to a power conversion device to be installed in a hybrid vehicle or an electric vehicle and a capacitor module configuring the power conversion device.

BACKGROUND ART

A power conversion device normally includes an inverter circuit that generates AC power from DC power provided thereto and a control circuit via which the inverter circuit is controlled. Miniaturization of such power conversion devices has been eagerly pursued in recent years. In application areas such as hybrid vehicles and electric vehicles, in particular, the space taken up by a power conversion device in an engine compartment outside the cabin needs to be minimized and thus, further effort for miniaturization must be made so as to improve the installation flexibility of the device in the vehicles.

In addition, there is a distinct tendency whereby the motor utilized as a drive source is engaged in operation over extended periods of time and under extended operating conditions (i.e., higher output torque conditions), and thus, even greater current and higher voltage need to be assured through power conversion. Against this backdrop, momentary spiking of voltage (surge voltage) tends to occur as the power semiconductor elements configuring the inverter circuit are engaged in switching operation. The surge voltage occurring in such an instance manifests as the product of the total of the values of inductance at the bus bars in the capacitor module and the power semiconductor modules and the extent of change occurring in the current during the switching operation. Configuring a capacitor module with a bus bar structure assuring a low inductance value is considered an effective means for inhibiting surge current and thus ensuring that the power semiconductor elements are driven within a safe operation range.

Patent literature 1 discloses an example of a system through which lower inductance is achieved at bus bars.

However, the inductance at the bus bars needs to be further lowered in order to allow power conversion devices to achieve an even greater current and an even higher voltage.

CITATION LIST

Patent Literature

PTL1: Japanese Laid Open Patent Publication No. 2007-143272

SUMMARY OF INVENTION

Technical Problem

An object of the present invention is to achieve a greater current and a higher voltage in a power conversion device.

Solution to Problem

In order to achieve the above object, a capacitor module according to the present invention comprises: a first capacitor element; a second capacitor element; a positive pole-side bus bar through which a positive pole-side current is transmitted; and a negative pole-side bus bar disposed in a laminated state, in which the positive pole-side bus bar and the negative pole-side bus bar are laminated via an insulating member, wherein: the first capacitor element includes a first body portion where an electric charge is stored, a first positive pole-side electrode disposed on one side of the first body portion, and a first negative pole-side electrode disposed so as to face the first positive pole-side electrode via the first body portion; the second capacitor element includes a second body portion where an electric charge is stored, a second positive pole-side electrode disposed on one side of the second body portion, and a second negative pole-side electrode disposed so as to face the second positive pole-side electrode via the second body portion; the first capacitor element is disposed so that the first positive pole-side electrode assumes a position closer to the second negative pole-side electrode than to the second positive pole-side electrode and faces the second negative pole-side electrode; and a laminate portion formed with the positive pole-side bus bar and the negative pole-side bus bar continues up to a point over a space where the first positive pole-side electrode and the second negative pole-side electrode face each other.

By this means, at the positive pole-side bus bar and the negative pole-side bus bar disposed in a laminated state in this capacitor module, lower inductance is achieved by allowing the magnetic flux-canceling effect (an inductance reducing effect through mutual inductance) attributable to the same-phase bidirectional currents flowing in close proximity to each other, to act over a wide area at the positive pole-side bus bar and the negative pole-side bus bar.

In addition, since lowered inductance at the bus bars in the capacitor module makes it possible to suppress voltage surge, the required voltage-withstand value at the power semiconductor elements can be lowered, which, in turn, enables miniaturization of the elements and ultimately miniaturization of the power conversion device itself.

Advantageous Effects of Invention

According to the present invention, a greater current and a higher voltage are achieved in a power conversion device.

DESCRIPTION OF EMBODIMENTS

Figure 1:
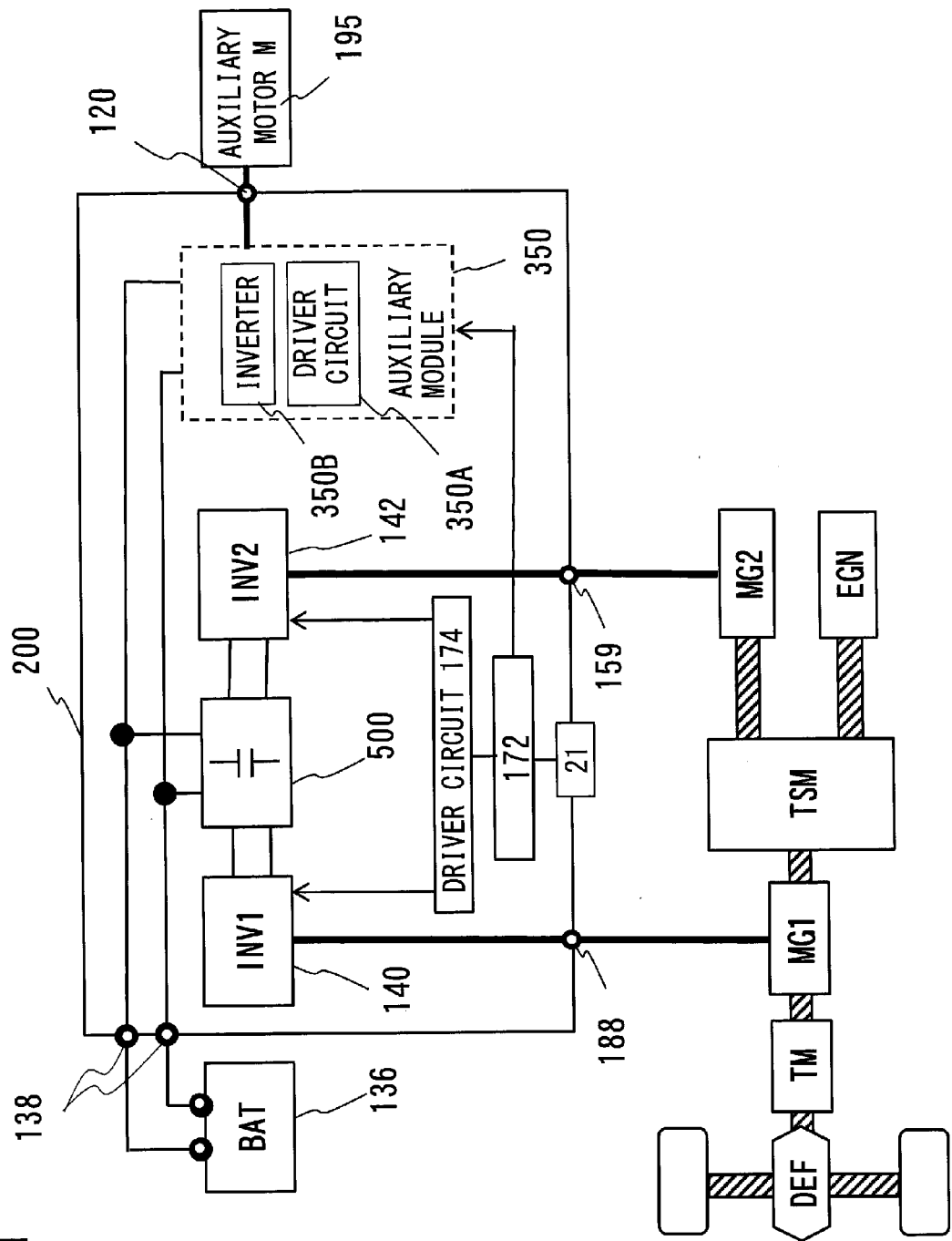
FIG. 1 A system configuration diagram pertaining to a hybrid vehicle system

Next, an embodiment of the present invention will be described in reference to drawings. FIG. 1 is a system configuration diagram of a so-called hybrid vehicle system that uses both an (internal combustion) engine and an (electric) motor in traveling operation, having installed therein the power conversion device according to the present invention. The power conversion device according to the present invention may be further adopted in an electric vehicle that exclusively uses a motor in traveling operation, as well as in a hybrid vehicle, and it may be further utilized as a power conversion device to drive a motor in a regular industrial machine. However, as has been explained above and will be further explained later, the power conversion device according to the present invention achieves outstanding advantages in applications in the hybrid vehicle and the electric vehicle in particular from various aspects including miniaturization, greater current and higher voltage in power conversion and the like. The structure of the power conversion device installed in a hybrid vehicle will be substantially identical to that of the power conversion device installed in an electric vehicle, and accordingly, the power conversion device used in a hybrid vehicle will be described below as a typical example.

An engine EGN, a motor generator MG 1 and a motor generator MG 2 generate traveling torque for the vehicle. In addition, the motor generator MG 1 and the motor generator MG 2, which generate rotational torque, also have a function of converting mechanical energy provided thereto from an outside source to electric power. The motor generator MG 1 or MG 2 may configure, for instance, a synchronous machine or an induction machine and be engaged in operation through a specific operating method either as a motor or a generator, as mentioned earlier.

The torque output of the engine EGN and the torque output from the motor generator MG 2 are transmitted to the motor generator MG 1 via a power transfer mechanism TSM, and rotational torque from the power transfer mechanisms TSM or rotational torque generated at the motor generator MG 1 is transmitted to the wheels via a transmission TM and a differential gear unit DEF. During a regenerative braking operation, rotational torque from the wheels is transmitted to the motor generator MG 1, which then generates AC powered based upon the rotational torque provided thereto. The AC power thus generated is converted to DC power at a power conversion device 200, as will be explained later, the DC power resulting from the conversion charges a high-voltage battery 136 and the power charged in the battery is then used as traveling energy. In addition, as the power stored in the high-voltage battery 136 becomes low, rotational energy generated at the engine EGN is converted to AC power at the motor generator MG 2, the AC power is then converted to DC power at the power conversion device 200, and the battery 136 that can thus be charged with the DC power resulting from the conversion. The transmission of mechanical energy from the engine EGN to the motor generator MG 2 is achieved via the power transfer mechanism TSM.

Next, the power conversion device 200 will be described. An inverter circuit 140 and an inverter circuit 142 are electrically connected with the battery 136 via DC connectors 138 so as to allow the battery 136 and the inverter circuit 140 or 142 to exchange power with each other. When the motor generator MG 1 is engaged in operation as a motor, the inverter circuit 140 generates AC power with DC power provided thereto from the battery 136 via the corresponding DC connector 138 and provides the AC power thus generated to the motor generator MG 1 via an AC connector 188. The motor generator MG 1 and the inverter circuit 140 together configure a first motor generator unit. Likewise, when the motor generator MG 2 is engaged in operation as a motor, the inverter circuit 142 generates AC power with DC power provided thereto from the battery 136 via the corresponding DC connector 138 and provides the AC power thus generated to the motor generator MG 2 via an AC terminal 159. The motor generator MG 2 and the inverter circuit 142 together configure a second motor generator unit. Depending upon the operating conditions, the first motor generator unit and the second motor generator unit may both be engaged in operation as motors or generators, or one may be engaged in operation as a motor with the other as a generator. In addition, one of them may be turned off and thus remain in a non-operating state.

It is to be noted that the vehicle in the embodiment can be driven with the motive power provided by the motor generator MG 1 alone by engaging the first motor generator unit in operation as a motor unit with power from the battery 136. In addition, the battery 136 in the embodiment can be charged with power generated by engaging the first motor generator unit or the second motor generator unit in operation as a generator unit with motive power from the engine EGN or motive power from the wheels.

The battery 136 is also used as a source of power to drive an auxiliary motor 195. The auxiliary motor may be used to drive, for instance, a compressor in an air-conditioning system or to drive a hydraulic pump for a cooling system. DC power from the battery 136 is provided to an auxiliary power module 350 where AC power is generated, and the AC power thus generated is then provided to the auxiliary motor 195 via an AC terminal 120. The auxiliary power module 350, having a circuit structure and functions basically identical to those of the inverter circuits 140 and 142, controls the phase, the frequency and the level of AC power provided to the auxiliary motor 195. Since the capacity of the auxiliary motor 195 is smaller than the capacities of the motor generators MG 1 and MG2, the maximum power resulting from the power conversion at the auxiliary power module 130 is less than that achieved at the inverter circuit 140 or 142. However, the basic structure and the basic operation of the auxiliary power module 350 are substantially the same as those of the inverter circuits 140 and 142, as has been explained above. It is to be noted that the power conversion device 200 includes a capacitor module 500 that smooths the DC power to be provided to the inverter circuit 140, the inverter circuit 142 and an inverter circuit 350B.

The power conversion device 200 includes a communication connector 21 via which a command issued by a higher-order control device is received or data indicating conditions are transmitted to the higher-order control device. In response to a command received via the connector 21, a control circuit 172 executes an arithmetic operation to calculate a control quantity based upon which the motor generator MG 1, the motor generator MG 2 or the auxiliary motor 195 is to be controlled, further executes an arithmetic operation to determine whether or not the particular machine is to be engaged in operation as a motor or generator, generates a control pulse based upon the operation results and provides the control pulse to a driver circuit 174 or a driver circuit 350A in the auxiliary power module 350. The auxiliary power module 350 may include its own dedicated control circuit, and in such a case, this dedicated control circuit will generate a control pulse based upon a command received via the connector 21 and the control pulse thus generated will be provided to the driver circuit 350A in the auxiliary power module 350.

Based upon the control pulse provided as described above, the driver circuit 174 generates a drive pulse to be used to control the inverter circuit 140 or the inverter circuit 142. In addition, a control pulse to be used to drive the inverter circuit 350B in the auxiliary power module 350 is generated at the driver circuit 350A.

Figure 2:
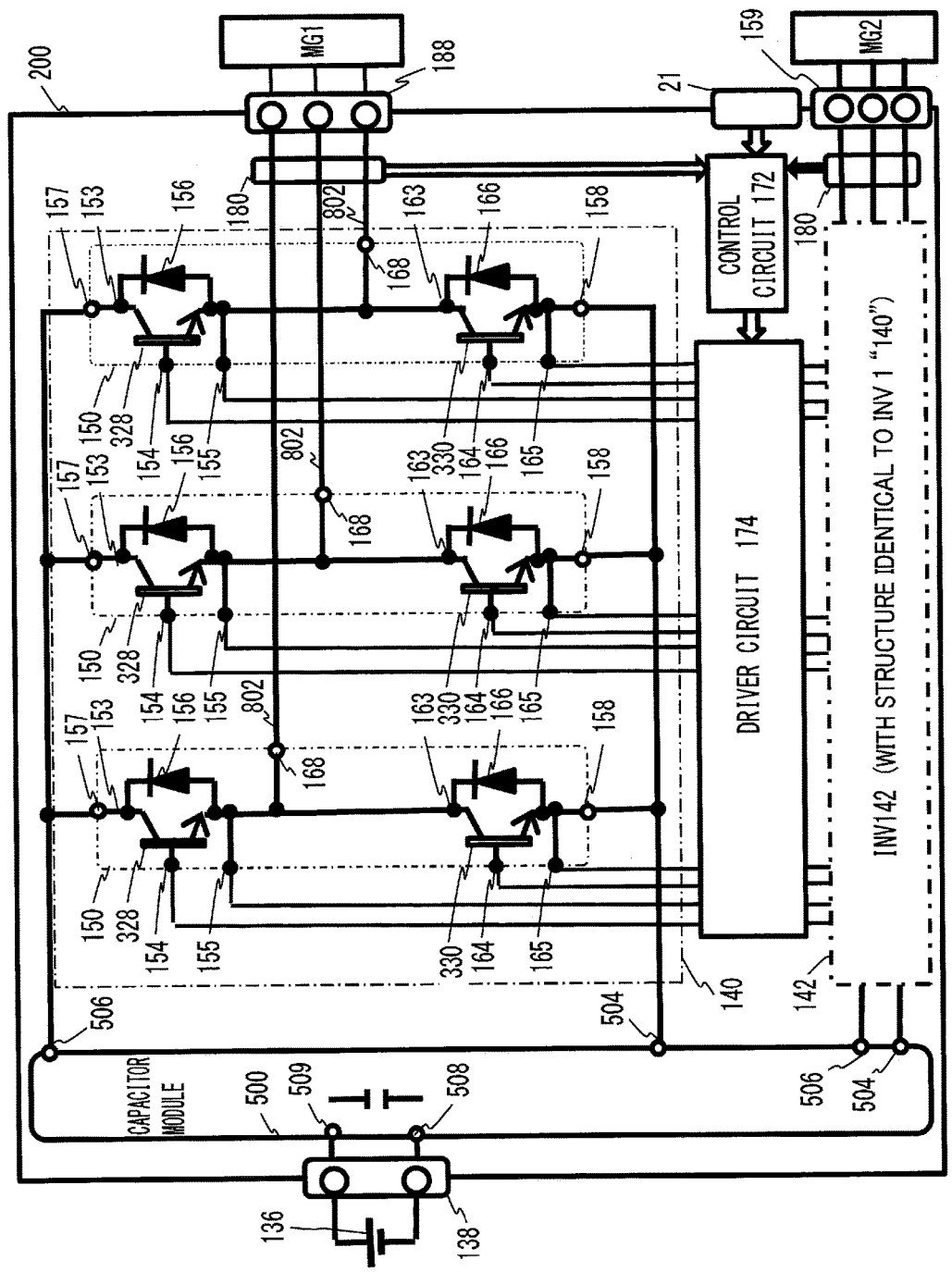
FIG. 2 A circuit diagram showing the structure of the electric circuit in FIG. 1

Next, in reference to FIG. 2, the structure of the electric circuit constituting the inverter circuit 140 or the inverter circuit 142 will be described. Since the inverter circuit 350B in the auxiliary power module 350 shown in FIG. 1 also assumes a basic circuit structure similar to that of the inverter circuit 140, FIG. 2 does not show the circuit structure of the inverter 350B in detail, and an explanation will be given in reference to FIG. 2 on the structure of the inverter circuit 140 as a typical example. However, since the power output of the auxiliary power module 350 is smaller, the semiconductor chips constituting upper arms and lower arms corresponding to the various phases and a circuit connecting the chips, as will be explained below, are all disposed together within the auxiliary power module 350.

In addition, since the inverter circuit 140 and the inverter circuit 142 have similar circuit structures and operate in much the same way, the following explanation will concentrate on the circuit structure and the operation of the inverter circuit 140 as a typical example.

It is to be noted that the semiconductor elements used in the embodiment, as will be described below, are insulated gate bipolar transistors, which will be simply notated as IGBTs. The inverter circuit 140 includes upper arm/lower arm serial circuits 150, each formed with an IGBT 328 to operate as an upper arm and a corresponding diode 156, an IGBT 330 to operate as a lower arm and a corresponding diode 166 in correspondence to the three phases, i.e., the U-phase, the V-phase and the W-phase, of the AC power to be output.

In the embodiment, each of these three phases correspond to one of the three phase windings constituting the armature winding in the motor generator MG 1. At the upper arm/lower arm serial circuit 150 corresponding to a given phase among the three phases, an AC current is output from an intermediate electrode 168 located at a middle point in the particular serial circuit, and this AC current is routed through the AC connector 188 to an AC bus bar 802 that constitutes an AC power line to the motor generator MG 1, as will be described below.

A collector electrode 153 of the IGBT 328 forming the upper arm is electrically connected via a positive terminal 157 to a positive pole-side capacitor terminal 506 of the capacitor module 500, whereas an emitter terminal of the IGBT 330 forming the lower arm is electrically connected, via a negative terminal 158, to a negative pole-side capacitor terminal 504 of the capacitor module 500.

The IGBT 328 includes the collector electrode 153, a signal emitter electrode (an emitter electrode for signal) 155 and a gate electrode 154. In addition, the IGBT 330 includes a collector electrode 163, a signal emitter 165 and a gate electrode 164. The diode 156 is electrically connected between the collector electrode 153 and the emitter electrode at the IGBT 328. The diode 166 is electrically connected between the collector electrode 163 and the emitter electrode at the IGBT 330. A metal oxide semiconductor field effect transistor (hereafter notated as a MOSFET) may be used to constitute a switching power semiconductor element instead. No diode 156 or 166 will be required in conjunction with such a switching power semiconductor element. A switching power semiconductor element constituted with an IGBT performs well in conjunction with a relatively high DC voltage, whereas a switching power semiconductor element constituted with a MOSFET performs well in conjunction with a relatively low DC voltage.

The capacitor module 500 includes a plurality of positive pole-side capacitor terminals 506, a plurality of negative pole-side capacitor terminals 504, a positive pole-side source terminal 509 and a negative pole-side source terminal 508. High-voltage DC power from the battery 136 is provided to the positive pole-side source terminal 509 and the negative pole-side source terminal 508 via the DC connector 138, and is then provided, through the plurality of positive pole-side capacitor terminals 508 and the plurality of negative pole-side capacitor terminals 504 at the capacitor module 500, to the inverter circuit 140, the inverter circuit 142 and the auxiliary power module 350. DC power resulting from conversion of AC power at the inverter circuit 140 or the inverter circuit 142, on the other hand, is provided to the capacitor module 500 through the corresponding positive pole-side capacitor terminal 506 and the negative pole-side capacitor terminal 504, is further provided through the positive pole-side source terminal 509 and the negative pole-side source terminal 508, to the battery 136 via the DC connector 138, and is stored into the battery 136.

The control circuit 172 includes a microcomputer that executes arithmetic processing to determine switching timing for the IGBTs 328 and IGBTs 330. A target torque value indicating the target torque required of the motor generator MG 1, the values of the currents provided from the upper arm/lower arm serial circuits 150 to the motor generator MG 1 and the magnetic pole positions at the rotor in the motor generator MG 1 are indicated in information input to the microcomputer. The target torque value is determined based upon a command signal output from the higher-order control device (not shown). The current values are detected based upon a detection signal provided by a current sensor 180. The magnetic pole positions are detected based upon detection signals output from a rotating magnetic pole sensor (not shown), such as a resolver, installed at the motor generator MG 1. While the current sensor 180 in the embodiment detects current values each in correspondence to one of the three phases, the present invention may instead be adopted in conjunction with a current sensor that detects current values for two phases and in such a case, the current value for the third phase may be determined through arithmetic operation.

Figure 3:
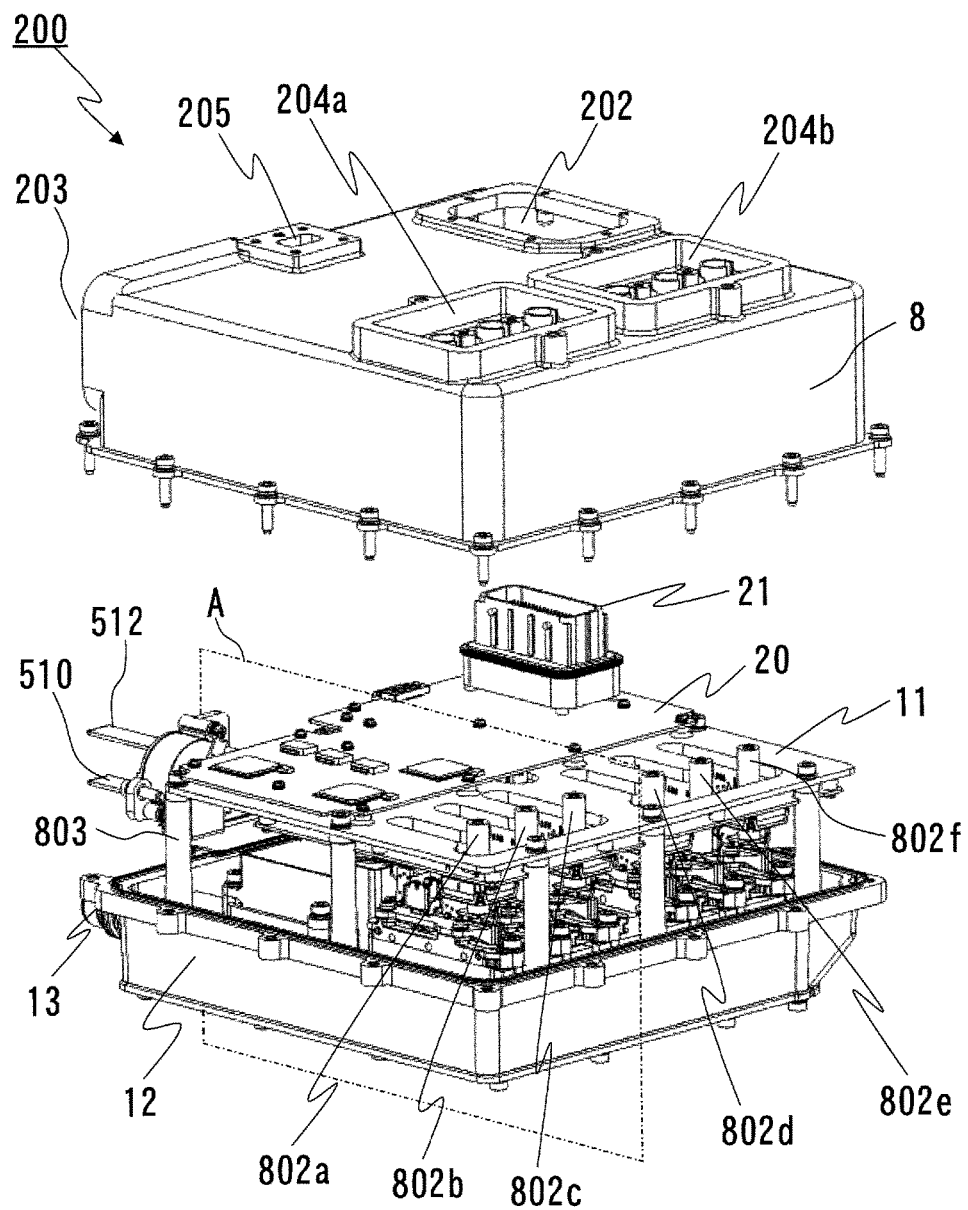
FIG. 3 An exploded perspective showing the structure of the power conversion device FIG. 4 An exploded perspective showing the individual structural components of the power conversion device, in reference to which the overall structure of the power conversion device will be described FIG. 5 A view of the flow passage forming member 12 in FIG. 4, taken from the bottom side, to illustrate the flow passage forming member 12

FIG. 3 is an exploded perspective of the power conversion device 200 achieved in an embodiment of the present invention. The power conversion device 200 comprises a flow passage forming member 12 that functions as a case where power semiconductor modules 300a through 300c, power semiconductor modules 301a through 301c and the capacitor module 500 are housed, as will be described later, and also forms a flow passage, and a lid 8. It is to be noted that the power conversion device may include a separate casing in addition to the flow passage forming member 12 in the embodiment so as to house the flow passage forming member 12 inside the casing.

The lid 8 with circuit components configuring the power conversion device 200 housed therein is fixed to the flow passage forming member 12. A control circuit board 20 with the control circuit 172 mounted thereupon is disposed on the upper side inside the lid 8. At the top surface of the lid 8, a first opening 202, a third opening 204a, a fourth opening 204b and a fifth opening 205 are formed. In addition, a second opening 203 is formed at a side wall of the lid 8.

The connector 21, disposed at the control circuit board 20, projects to the outside via the first opening 202. A negative pole-side power line 510 and a positive pole-side power line 512, electrically connecting the DC connector 138, the capacitor module 500 and the like, project to the outside via the second opening 203.

An AC-side relay conductor 802a is connected to the power semiconductor module 300a and projects to the outside via the third opening 204a. An AC-side relay conductor 802b is connected to the power semiconductor module 300b and projects to the outside via the third opening 204a. An AC-side relay conductor 802c is connected to the power semiconductor module 300c and projects to the outside via the third opening 204a. An AC side relay conductor 802d is connected to the power semiconductor module 301a and projects to the outside via the fourth opening 204b. An AC side relay conductor 802e is connected to the power semiconductor module 301b and projects to the outside via the fourth opening 204b. An AC side relay conductor 802f is connected to the power semiconductor module 301c and projects to the outside via the fourth opening 204b. An AC output terminal at the auxiliary power module 350 (not shown) projects to the outside via the fifth opening 205.

The orientation of the connecting surface of a terminal such as the connector 21 is set along a specific direction, as dictated by the type of vehicle in which the power conversion device is installed. In a compact vehicle, it is desirable to install the power conversion device 200 with the connecting surface facing upward and accessible from the outside in consideration of the limited space available in the engine compartment and ease of assembly. For instance, the connecting surfaces of the connectors at the power conversion device 200 disposed above the transmission TM should be made to project toward the side opposite from the side where the transmission TM is located so as to improve the ease of access.

It is to be noted that the lid 8, which is constituted of metal, functions as a case that houses the power semiconductor modules 300a through 300c and 301a through 301c, a driver circuit board 22 (see FIG. 4), the control circuit board 20 and a metal base plate 11.

In addition, the connector 21 projects to the outside of the lid 8 from the housing space within the lid 8 via the first opening 202. Thus, even when a physical force originating from an external source is applied to the connector 21 mounted at the control circuit board 20 attached on the metal base plate 11, the control circuit board 20 is not subject to a significant load, which promises an improvement in reliability and durability.

Figure 4:
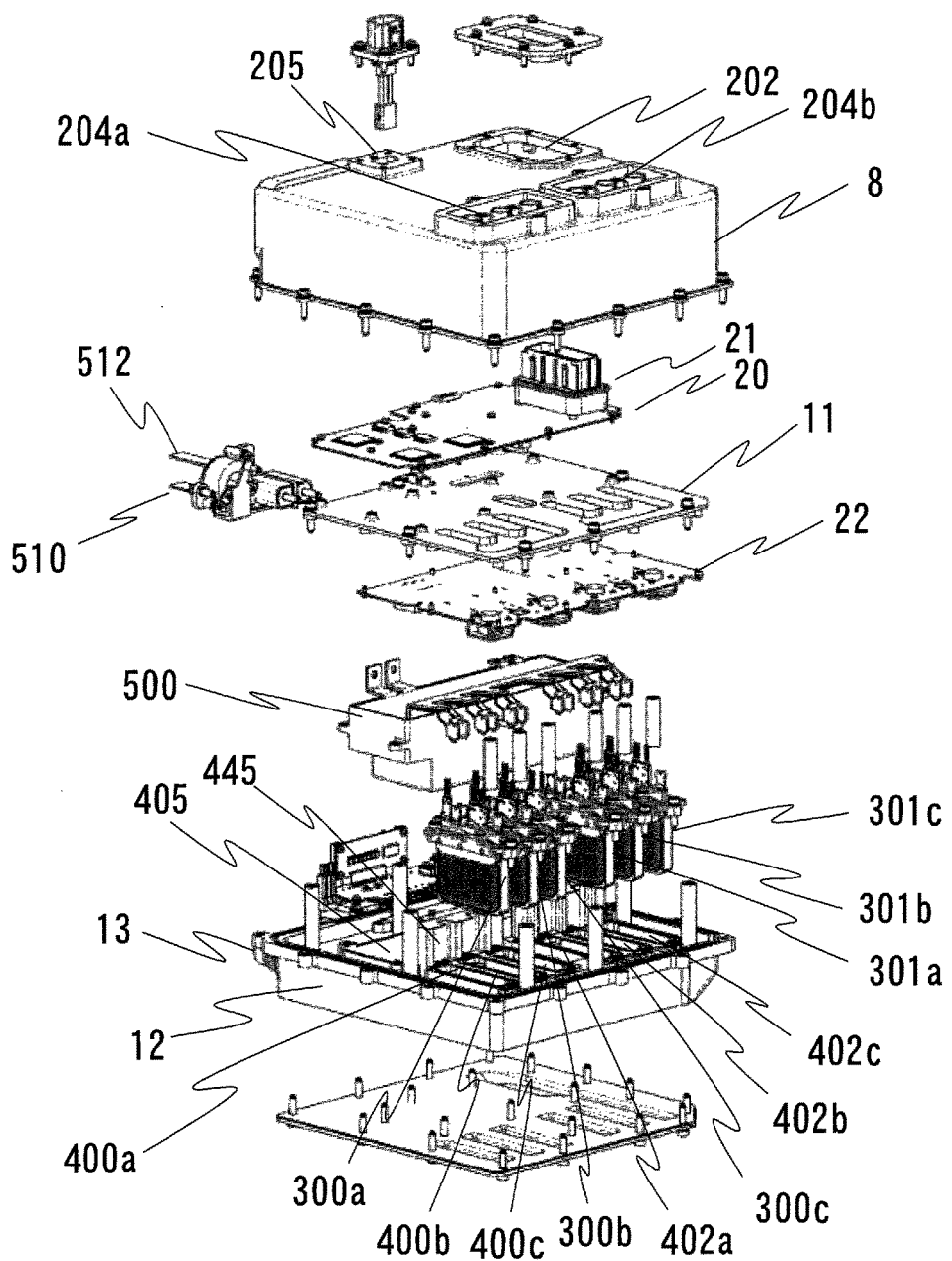

FIG. 4 is a perspective providing an overall view of the flow passage forming member 12 in the power conversion device 200, with the structural components housed inside the flow passage forming member 12 shown in an exploded view for clarity.

The flow passage forming member 12 forms openings 400a through 400c and openings 402a through 402c that connect with a flow passage through which coolant flows. The power semiconductor modules 300a through 300c are inserted into openings 400a through 400c. The power semiconductor modules 301a through 301c are inserted into openings 402a through 402c.

In the flow passage forming member 12, a housing space 405, where the capacitor module 500 is to be housed, is formed at a side of the space where the power semiconductor modules 300a through 300c and the power semiconductor modules 301a through 301c are housed.

Since the capacitor module 500 is disposed substantially equidistant from the power semiconductor modules 300a through 300c and from the power semiconductor modules 301a through 301c, an optimal balance can be achieved with regard to the circuit constants for the smoothing capacitor and the power semiconductor module circuits through the three phases and ultimately, a circuit structure with which the occurrence of voltage spiking can be reduced readily is achieved.

By forming the main structure of the flow passage at the flow passage forming member 12 as an integrated part of the flow passage forming member 12 through aluminum casting, a flow passage assuring a good cooling effect and a high level of mechanical strength can be formed. In addition, the integrated structure of the flow passage forming member 12 and the flow passage achieved as an aluminum cast molding allows heat to be conducted readily and thus improves the cooling efficiency. It is to be noted that once the formation of the flow passage is completed by locking the power semiconductor modules 300a through 300c and the power semiconductor modules 301a through 301c to the flow passage, a water leak test of the flow passage is conducted. Only after the flow passage passes the water leak test, the capacitor module 500, the auxiliary power module 350 and the boards can be mounted. As described above, the power conversion device 200 adopts a structure that includes the flow passage forming member 12 disposed at the bottom thereof and allows other necessary components such as the capacitor module 500, the auxiliary power module 350 and the boards to be fixed in sequence from above, thereby achieving an improvement in both productivity and reliability.

The driver circuit board 22 is disposed above the power semiconductor modules 300a through 300c, the power semiconductor modules 301a through 301c and the capacitor module 500. In addition, the metal base plate 11 is disposed between the driver circuit board 22 and the control circuit board 20. The metal base plate 11, which fulfills a function as an electromagnetic shield for a group of circuits mounted on the driver circuit board 22 and the control circuit board 20, also acts as a cooling plate via which heat generated at the driver circuit board 22 and the control circuit board 20 is released.

Furthermore, it achieves an effect of raising the mechanical resonance frequency at the control circuit board 20. Namely, since the screw retainers, via which the control circuit board 20 is locked to the metal base plate 11, can be disposed over short intervals, the distance between the bearing points at which any mechanical vibration is borne, is shortened and, as a result, a higher resonance frequency is achieved. For instance, the resonance frequency at the control circuit board 20 can be raised relative to the frequency of vibration transmitted from the transmission, so as to ensure that the control circuit board 20 is not readily subjected to the adverse effect of vibration and thus its reliability is improved.

Figure 5:
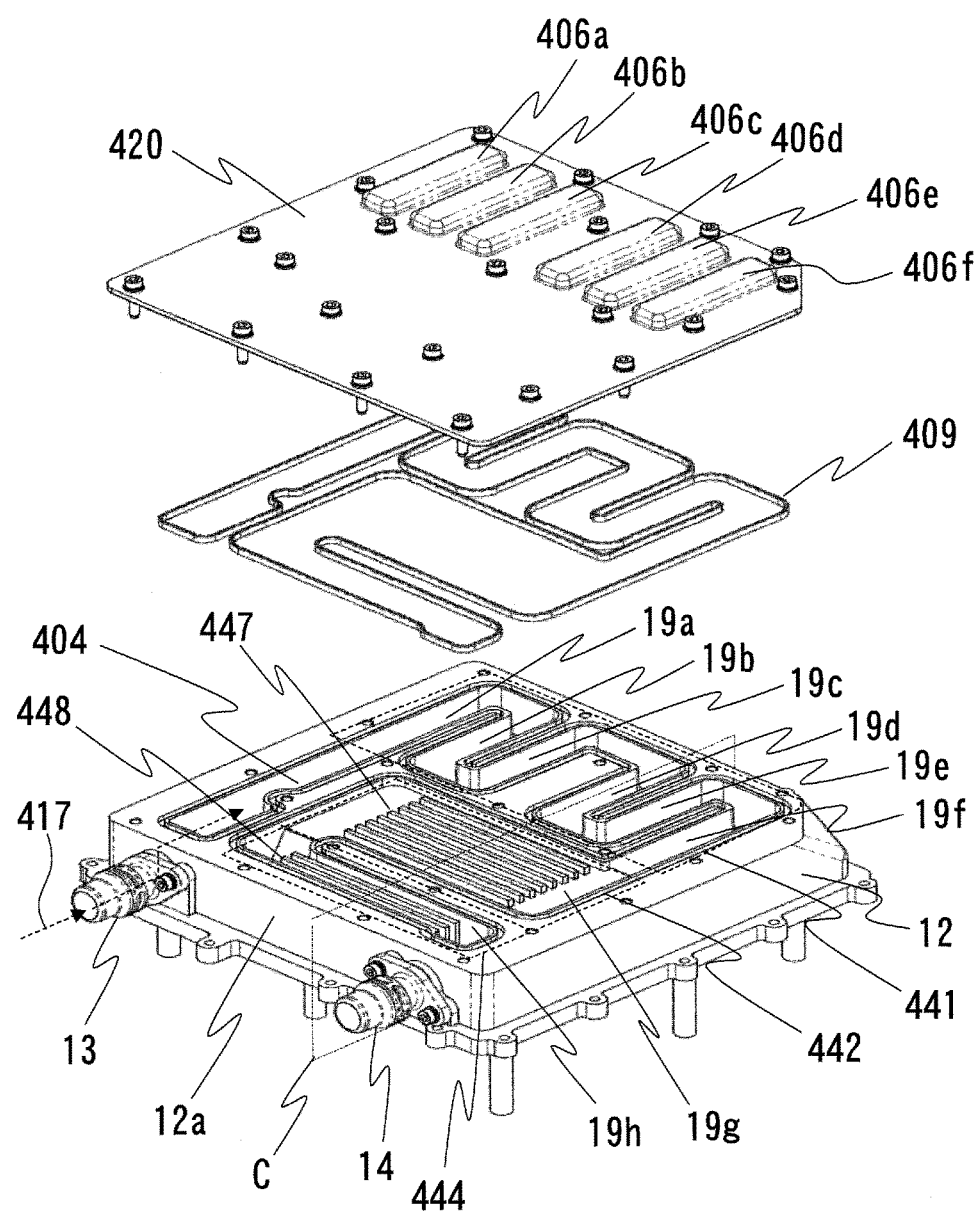

FIG. 5 illustrates the flow passage forming member 12 in a view taken from the bottom side of the flow passage forming member 12 shown in FIG. 4.

An intake pipe 13 and an outlet pipe 14 are disposed at a side wall 12a of the flow passage forming member 12. Coolant, having flowed in along a flowing direction 417 indicated by the dotted line, travels through the intake pipe 13 and flows through the first flow passage portion 19a formed along one side of the flow passage forming member 12. A second flow passage portion 19b, connected with the first flow passage portion 19a via a U-turn flow passage portion, is formed so as to extend parallel to the first flow passage portion 19a. A third flow passage portion 19c, connected with the second flow passage portion 19b via a U-turn flow passage portion, is formed so as to extend parallel to the second flow passage portion 19b. A fourth flow passage portion 19d, connected with the third flow passage portion 19c via a U-turn flow passage portion, is formed so as to extend parallel to the third flow passage portion 19c. A fifth flow passage portion 19e, connected with the fourth flow passage portion 19d via a U-turn flow passage portion, is formed so as to extend parallel to the fourth flow passage portion 19d. A sixth flow passage portion 19f, connected with the fifth flow passage portion 19e via a U-turn flow passage portion is formed so as to extend parallel to the fifth flow passage portion 19e. Namely, the first flow passage portion 19a through the sixth flow passage portion 19f together form a single, continuous switchback flow passage.

The power semiconductor module 300a is housed in the first flow passage portion 19a. The power semiconductor module 300b is housed in the second flow passage portion 19b. The power semiconductor module 300c is housed in the third flow passage portion 19c. The power semiconductor module 301a is housed in the fourth flow passage portion 19d. The power semiconductor module 301b is housed in the fifth flow passage portion 19e. The power semiconductor module 301c is housed in the sixth flow passage portion 19f.

A first flow passage forming member 441 forms the first flow passage portion 19a, the second flow passage portion 19b, the third flow passage portion 19c, the fourth flow passage portion 19d, the fifth flow passage portion 19e and the sixth flow passage portion 19f. The first flow passage portion 19a, the second flow passage portion 19b, the third flow passage portion 19c, the fourth flow passage portion 19d, the fifth flow passage portion 19e and the sixth flow passage portion 19f are all formed so as to achieve a greater measurement along the depth thereof relative to the measurement taken along the width thereof A seventh flow passage portion 19g, connecting with the sixth flow passage portion 19f, is formed at a position that faces the housing space 405 for the capacitor module 500 shown in FIG. 4. A second flow passage forming member 442 forms the seventh flow passage portion 19g. The seventh flow passage portion 19g is formed to achieve a greater measurement taken along the width thereof relative to the measurement taken along the depth thereof.

An eighth flow passage portion 19h, connecting with the seventh flow passage portion 19g, is formed at a position that faces the auxiliary power module 350 to be described later. In addition, the eighth flow passage portion 19h is connected with the outlet pipe 14. A third flow passage forming member 444 forms the eighth flow passage portion 19h. The eighth flow passage portion 19h is formed to achieve a greater measurement taken along the depth thereof relative to the measurement taken along the width thereof.

At the lower surface of the flow passage forming member 12, a single, continuous opening 404 is formed. The opening 404 is blocked by a lower cover 420. A sealing member 409, disposed between the lower cover 420 and the flow passage forming member 12, sustains a high level of airtightness.

In addition, projecting portions 406a through 406f, projecting toward the side further away from the flow passage forming member 12, are formed at the lower cover 420. The projecting portions 406a through 406f are disposed each in correspondence to one of the power semiconductor modules 300a through 300c and the power semiconductor modules 301a through 301c. Namely, the projecting portion 406a is formed so as to face opposite the first flow passage portion 19a. The projecting portion 406b is formed so as to face opposite the second flow passage portion 19b. The projecting portion 406c is formed so as to face opposite the third flow passage portion 19c. The projecting portion 406d is formed so as to face opposite the fourth flow passage portion 19d. The projecting portion 406e is formed so as to face opposite the fifth flow passage portion 19e. The projecting portion 406f is formed so as to face opposite the sixth flow passage portion 19f.

The seventh flow passage portion 19g is formed so that its depth and width greatly differ from the depth and width of the sixth flow passage portion 19f. It is desirable that the second flow passage forming member 442 include straight fins 447 projecting out at the seventh flow passage portion 19g so as to enable management of the rectification of the coolant and the flow rate through this significant alteration in the flow passage shape.

Likewise, the eighth flow passage portion 19h is formed so that its depth and width greatly differ from the depth and width of the seventh flow passage portion 19g. It is desirable that the third flow passage forming member 444 include straight fins 448 projecting out at the eighth flow passage portion 19h so as to enable management of the rectification of the coolant and the flow rate through this significant alteration in the flow passage shape.

In reference to FIG. 6 through FIG. 10, the structures of the power semiconductor modules 300a through 300c and the power semiconductor modules 301a through 301c used in the inverter circuit 140 will be described in detail. Since the structures adopted in the power semiconductor modules 300a through 300c and the power semiconductor modules 301a through 301c are identical to one another, the structure of the power semiconductor module 300a will be explained as a typical example. It is to be noted that signal terminals 325U in FIG. 6 through FIG. 10 correspond to the gate electrode 154 and the signal emitter electrode 155 shown in FIG. 2, whereas signal terminals 325L in FIG. 6 through FIG. 10 correspond to the gate electrode 164 and the emitter electrode 165 shown in FIG. 2. In addition, a DC positive terminal 315B is the same as the positive terminal 157 having been described in reference to FIG. 2, whereas a DC negative terminal 319B is the same as the negative terminal 158 having been described in reference to FIG. 2. Moreover, an AC terminal 320B is the same as the AC terminal 159 shown in FIG. 2.

FIG. 6(a) shows the power semiconductor module 300a achieved in the embodiment in a perspective. FIG. 6(b) is a sectional view of the power semiconductor module 300a in the embodiment through the section D in FIG. 6(a), taken from direction E in FIG. 6(a).

Figure 6:
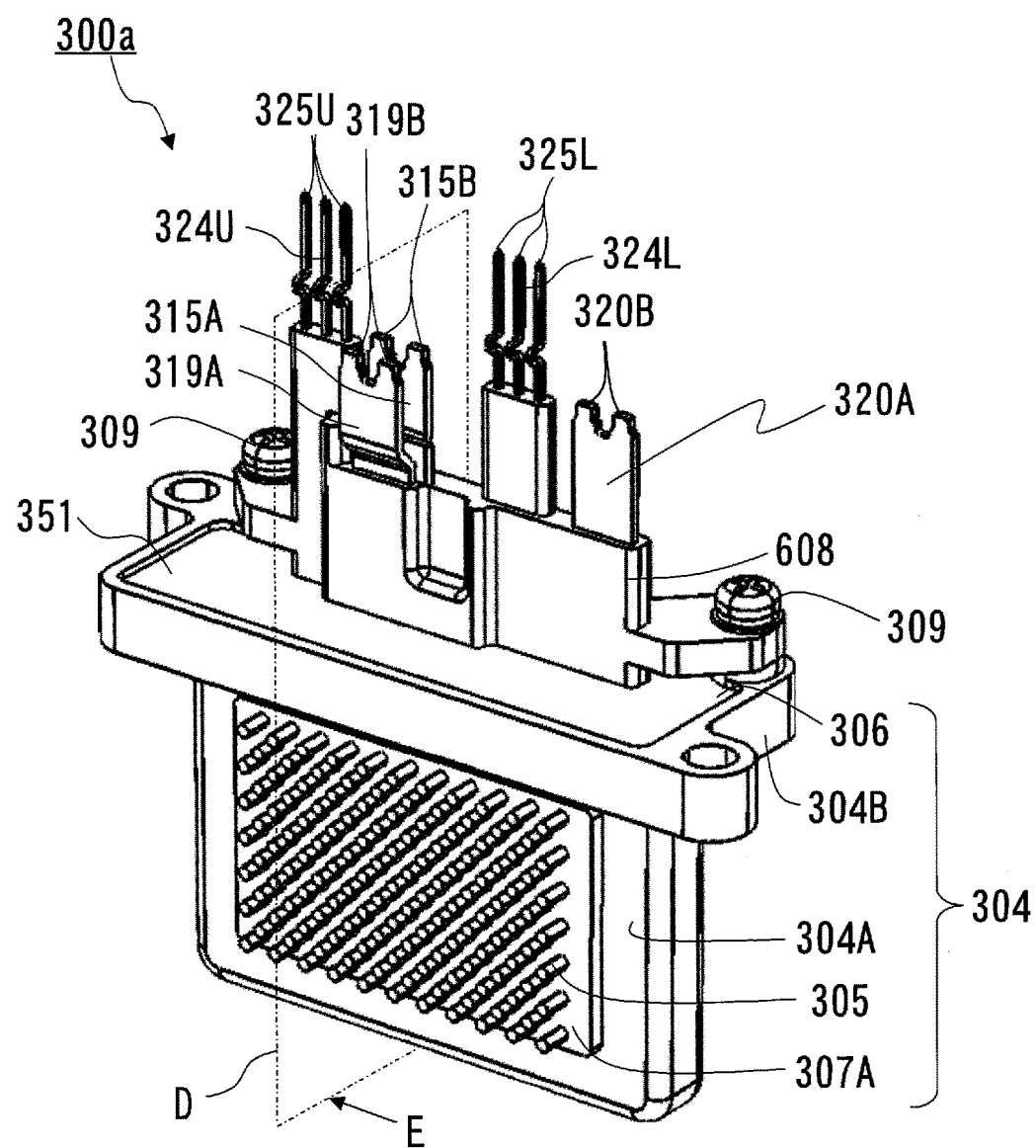
FIG. 6(a) An external view of the power semiconductor module 300a in a perspective FIG. 6(b) A sectional view of the power semiconductor module 300a through the section D in FIG. 6(a), taken from direction E in FIG. 6(a)
Figure 6:
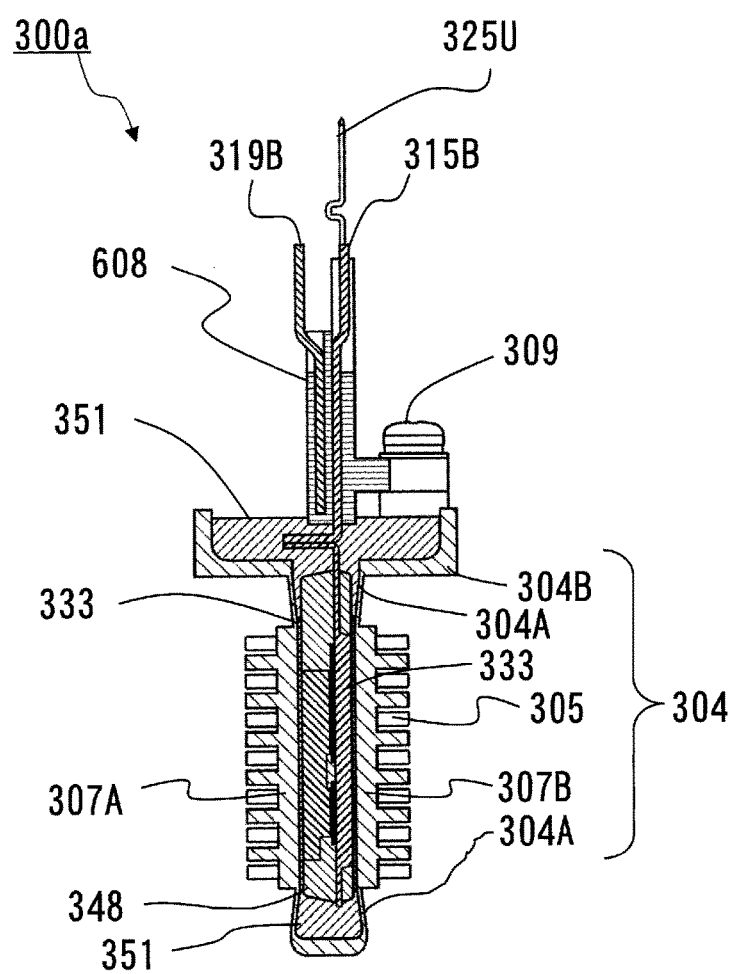

FIG. 7(a) is a perspective presenting a view of the power semiconductor module 300a without screws 309 and a second sealing resin 351 in FIG. 6 for better clarity in showing its structure. FIG. 7(b) is a sectional view of the power semiconductor module 300a in FIG. 7(a) through the section D, taken from direction E in FIG. 7(a). FIG. 7(c) is a sectional view of the power semiconductor module 300a before its small wall thickness portions 304a become deformed due to pressure applied to the fins 305.

Figure 7:
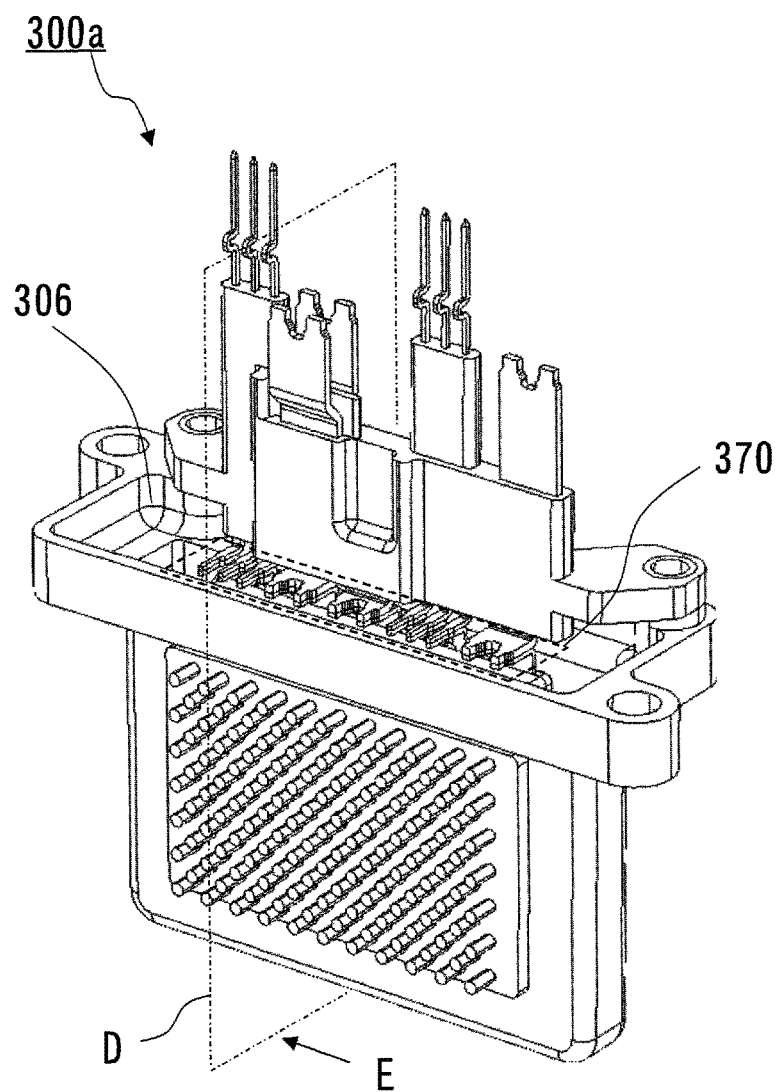
FIG. 7(a) A perspective of the power semiconductor module 300a without the screws 309 and the second sealing resin 351 shown in FIG. 6(a)
FIG. 7(b) A sectional view through the section D taken from direction E, as is the sectional view in FIG. 6(b)
FIG. 7(c) A sectional view taken before the small wall thickness portions 304A become deformed due to pressure applied to the fins 305
Figure 7:
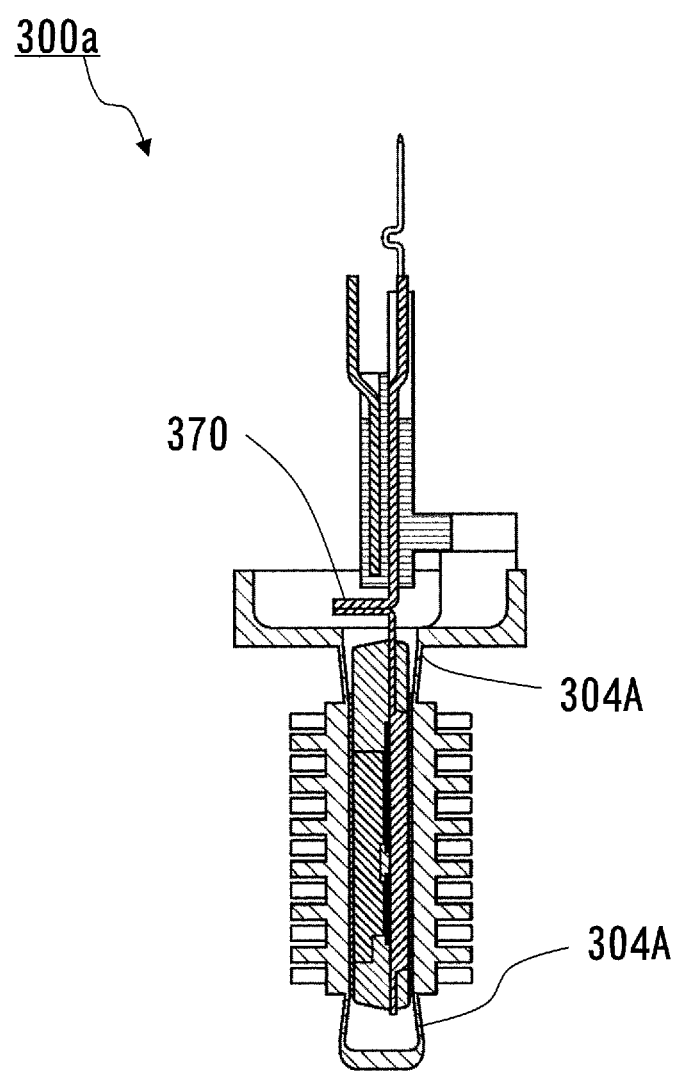
Figure 7:
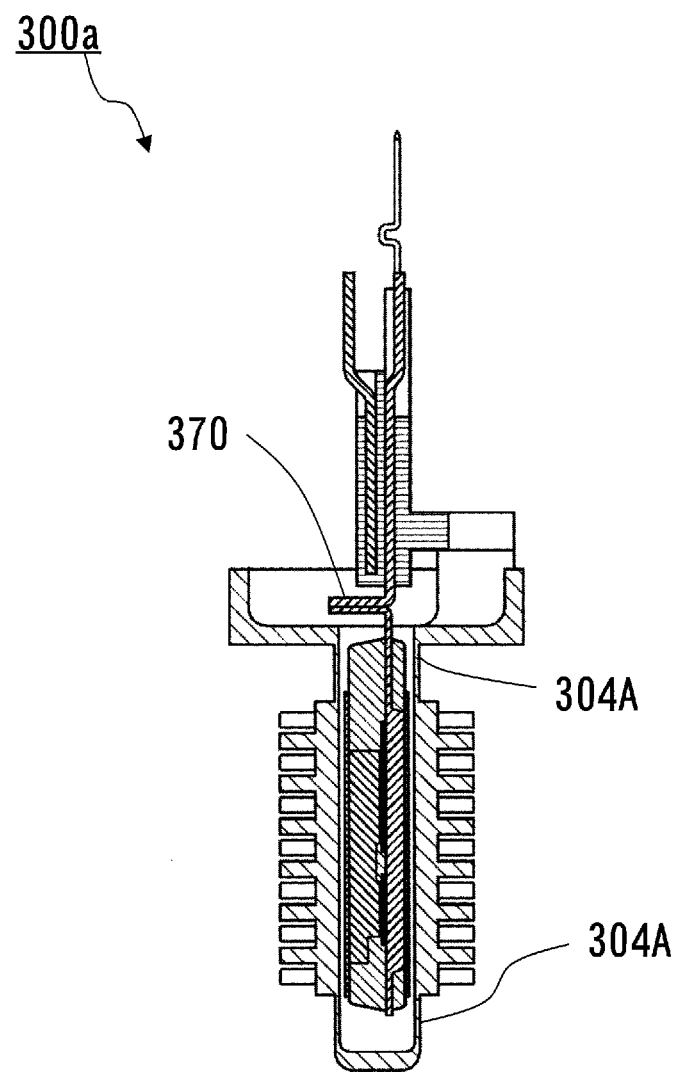
Figure 8:
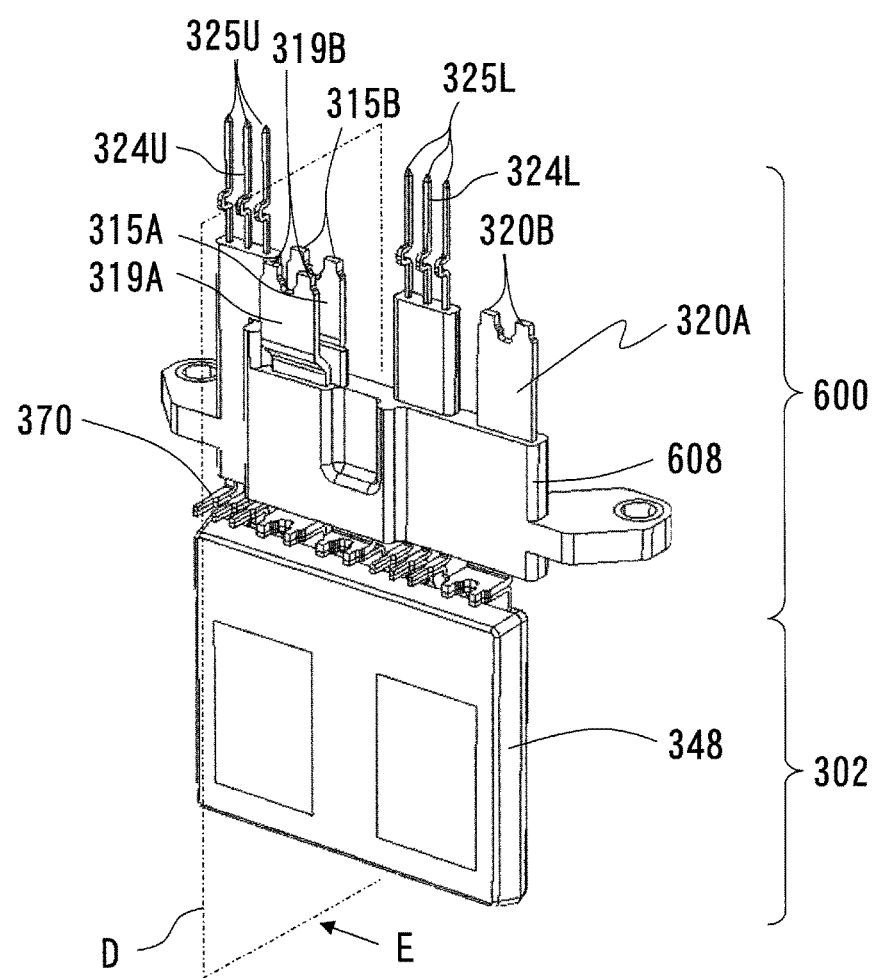
FIG. 8(a) A perspective of the power semiconductor module 300a without the module case 304 shown in FIG. 7(a)
FIG. 8(b) A sectional view through the section D taken from direction E, as are the sectional views in FIG. 6(b) and FIG. 7(b)
Figure 8:
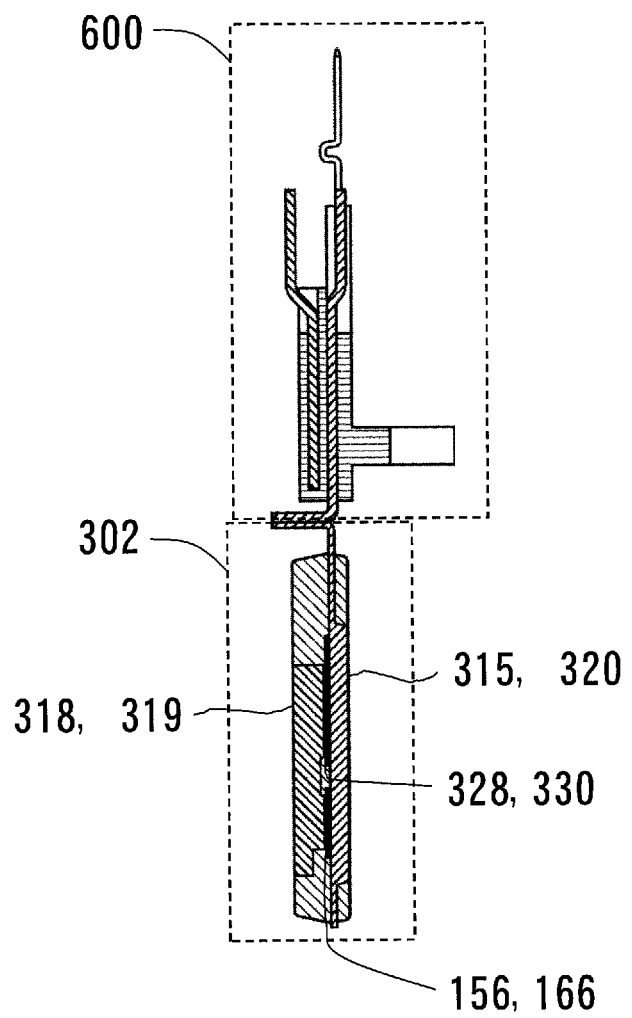

FIG. 8 is a perspective providing a view of the power semiconductor module 300a without a module case 304 in FIG. 7. FIG. 8(b) is a sectional view of the power semiconductor module 300a in FIG. 8(a) through the section D, taken from direction E.

Figure 9:
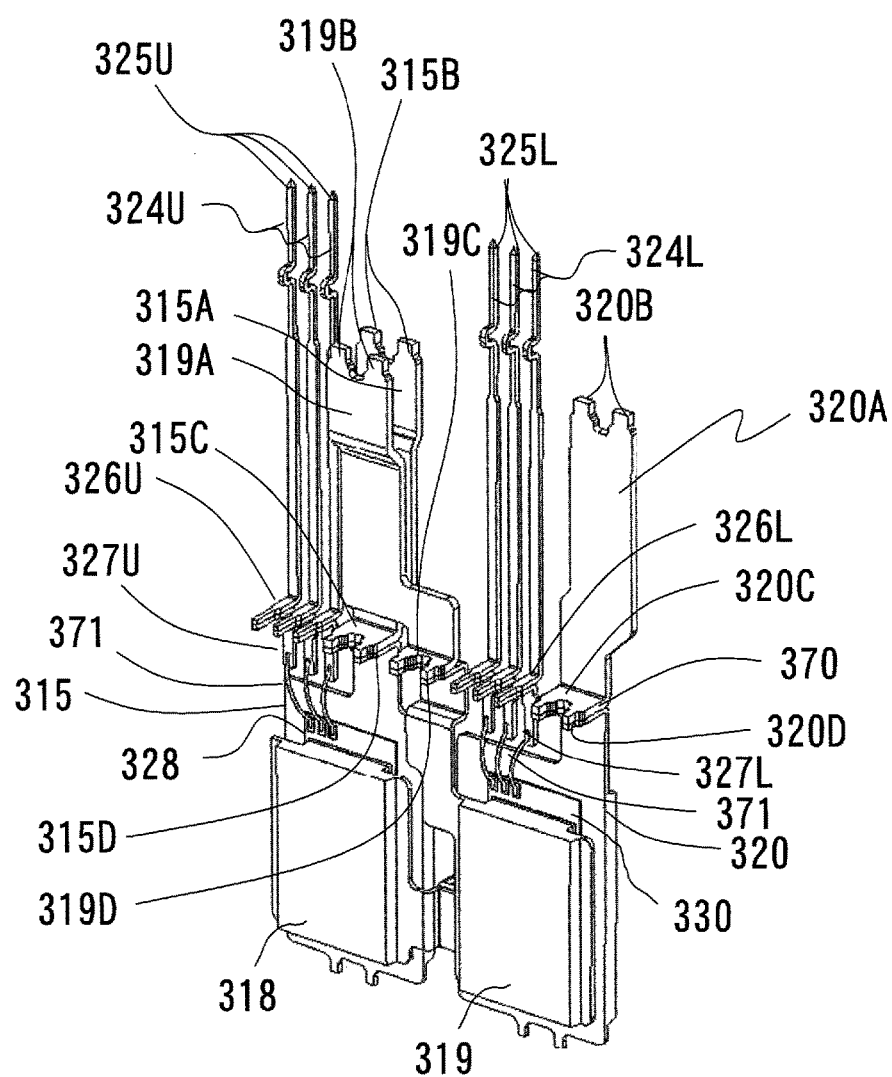
FIG. 9 A perspective of the power semiconductor module 300a without the first sealing resin 348 and the wiring insulating member 608 in FIG. 8

FIG. 9 is a perspective providing a view of the power semiconductor module 300a without a first sealing resin 348 and a wiring insulating member 608 in FIG. 8.

Figure 10:
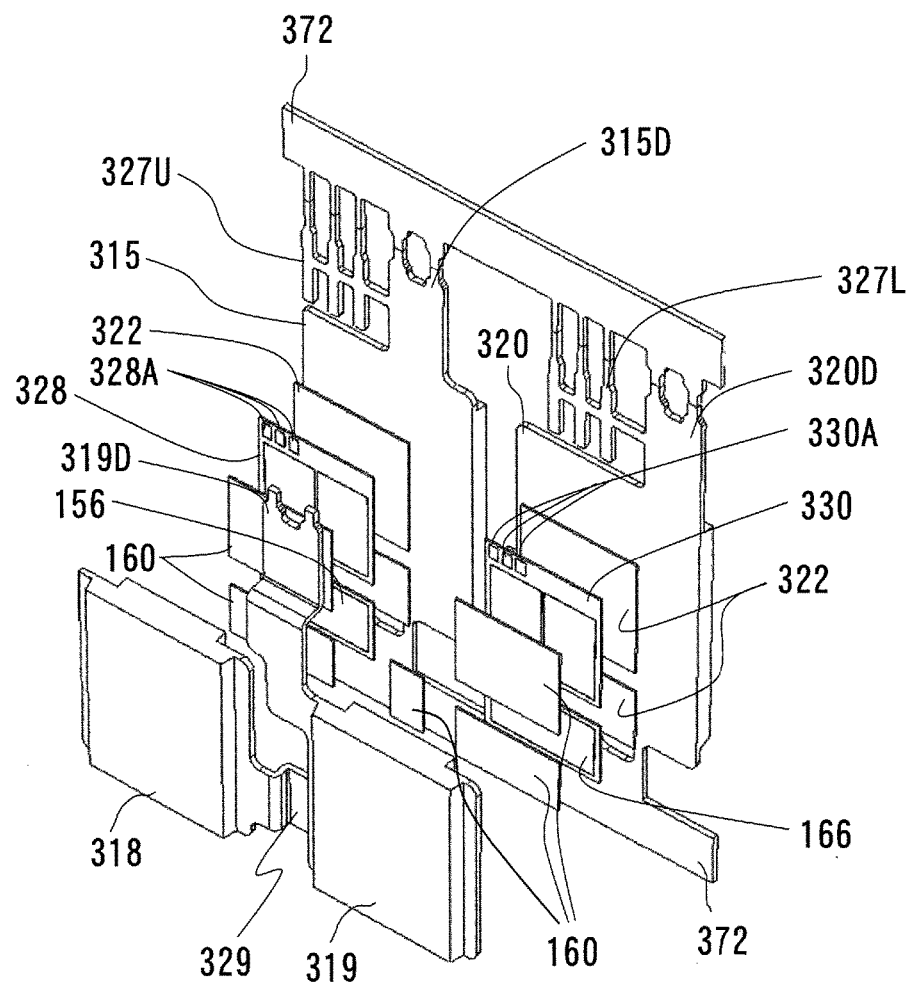
FIG. 10 An illustration showing how the primary sealed module assembly 302 is assembled FIG. 11(a) A perspective of the capacitor module 500

FIG. 10 illustrates how a primary sealed module assembly 302 is assembled.

The power semiconductor elements (the IGBT 328, the IGBT 330, the diode 156 and the diode 166) configuring the upper arm/lower arm serial circuit 150, held between a conductor plate 315 and a conductor plate 318 or between a conductor plate 320 and a conductor plate 319, are bonded in this state, as shown in FIG. 8 and FIG. 9. The conductor plate 315 and the like are sealed with the first sealing resin 348, with their heat releasing surfaces exposed, and insulating members 333 are deposited onto the heat releasing surfaces through thermo-compression bonding. As FIG. 8 shows, the first sealing resin 348 assumes a polyhedral shape (a substantially rectangular parallelepiped shape in this example).

The primary sealed module assembly 302, sealed with the first sealing resin 348, is inserted into the module case 304 and is bonded through thermo-compression to the inner surfaces of the module case 304, which is to function as a CAN cooler, via the insulating members 333. The term "CAN cooler" used in this context refers to a tubular cooler having an insertion opening 306 at one surface thereof and a solid bottom at the surface on the other side. A second sealing resin 351 is charged so as to fill in any voids remaining in the module case 304.

The module case 304 is constituted of a material achieving electric conductivity, such as an aluminum alloy material (Al, AlCi, AlCiC, Al—C or the like). The outer edge of the insertion opening 306 is surrounded by a flange 304B. In addition, as FIG. 6(a) shows, a first heat releasing surface 307A and a second heat releasing surface 307B, ranging over a greater area than the other surfaces, are set so as to face opposite each other, and the various power semiconductor elements (the IGBT 328, the IGBT 330, the diode 156 and the diode 166) are disposed so as to face opposite these heat releasing surfaces.

The three surfaces connecting with the first heat releasing surface 307A and the second heat releasing surface 307B, which face opposite each other, form surfaces enclosed over a width smaller than those of the first heat releasing surface 307A and the second heat releasing surface 307B, and the insertion opening 306 is formed at the remaining surface. The module case 304 does not need to achieve a perfect rectangular parallelepiped shape, and may have rounded corners, as shown in FIG. 6(a).

The flange 304B keeps the module case 304, constituted of metal and formed in the shape described above, sealed against the coolant even when it is inserted in the flow passage where the coolant, such as water or oil, flows. In other words, entry of the cooling medium into the module case 304 can be prevented through a simple structure. In addition, the fins 305 are uniformly formed at both the first heat releasing surface 307A and the second heat releasing surface 307B facing opposite each other. Furthermore, a small wall thickness portion 304A with an extremely small wall thickness is formed around the outer edge of each of the heat releasing surfaces, i.e., the first heat releasing surface 307A and the second heat releasing surface 307B. Since the wall thickness at the small wall thickness portions 304A are extremely small, i.e., small enough to readily become deformed as pressure is applied to the fins 305, better productivity is assured following the insertion of the primary sealed module assembly 302.

By bonding the conductor plate 315 and the like, through thermo-compression to the inner walls of the module case 304 via the insulating members 333 as described earlier, voids that may be present between the conductor plate 315 and the like and the inner walls of the module case 304 are minimized, and as a result, the heat generated at the power semiconductor elements can be transferred to the fins 305 efficiently. Furthermore, by forming the insulating members 333 so as to achieve a sufficient thickness and a certain level of flexibility, it can be ensured that any thermal stress that may occur is absorbed at the insulating members 333, and consequently, a module case ideal for application in a power conversion device to be installed in a vehicle, where it will be subjected to greatly varying temperature conditions, is achieved.

Outside the module case 304, a DC positive wiring 315A and a DC negative wiring 319A, constituted of metal, which are used to achieve electrical connection with the capacitor module 500, are disposed, with the DC positive terminal 315B and the DC negative terminal 319B respectively formed at the front ends thereof. In addition, a metal AC wiring 320A, through which AC power is to be provided to the motor generator MG 1 or MG 2, is disposed outside the module case 304, with the AC terminal 320B formed at the front end thereof. In the embodiment, the DC positive wiring 315A is connected with the conductor plate 315, the DC negative wiring 319A is connected with the conductor plate 319, and the AC wiring 320A is connected with the conductor plate 320, as indicated in FIG. 9.

In addition, metal signal wirings 324U and 324L, via which an electrical connection with the driver circuit 174 is achieved, are disposed outside the module case 304, and the signal terminals 325U and the signal terminals 325L are respectively formed at the front ends thereof. As FIG. 9 indicates, the signal wirings 324U are connected with the IGBT 328 and the signal wirings 324L are connected with the IGBT 330 in the embodiment.

The DC positive wiring 315A, the DC negative wiring 319A, the AC wiring 320A, the signal wirings 324U and the signal wirings 324L are formed as an integrated supplementary mold member 600 with the individual wirings insulated from one another via the wiring insulating member 608 formed with a resin material. The wiring insulating member 608 also functions as a supporting member that supports the various wirings, and an ideal resin material to constitute this wiring insulating member 608 will be a thermo-setting resin or a thermoplastic resin with an insulating property. Through these measures, it is ensured that the DC positive wiring 315A, the DC negative wiring 319A, the AC wiring 320A, the signal wirings 324U and the signal wiring's 324L are insulated from one another with a high degree of reliability, which, in turn, allows them to be disposed in a dense layout.

The supplementary mold member 600 is metal bonded to the primary sealed module assembly 302 at a connecting area 370 and is then locked to the module case 304 via screws 309 threaded into through holes formed at the wiring insulating member 608. The primary sealed module assembly 302 and the supplementary mold member 600 may be metal bonded at the connecting area 370 through, for instance, TIG welding.

The DC positive wiring 315A and the DC negative wiring 319A, laminated one on top of the other, face each other via the wiring insulating member 608, and range substantially parallel to each other. By disposing the DC positive wiring and the DC negative wiring assuming such shapes in this positional arrangement, it is ensured that electric currents that flow momentarily as the power semiconductor elements are engaged in switching operation, run parallel to each other along directions opposite from each other. As a result, an effect of the magnetic fields formed with the electric currents negating or canceling each other is achieved, and inductance is lowered through this effect. It is to be noted that the AC wiring 320A, the signal terminals 325U and 325L, too, extend along the direction matching the direction in which the DC positive wiring 315A and the DC negative wiring 319A extend.

The connecting area 370 at which the primary sealed module assembly 302 and the supplementary mold member 600 are connected with each other through metal bonding is sealed with the second sealing resin 351 within the module case 304. Since this assures, with a high level of reliability, the required insulation distance between the connecting area 370 and the module case 304, the power semiconductor module 300a can be miniaturized relative to the size of an unsealed power semiconductor module.

As shown in FIG. 9, on the side of the connecting area 370 where the supplementary module 600 is present, a supplementary module-side DC positive connector terminal 315C, a supplementary module-side DC negative connector terminal 319C, a supplementary module-side AC connector terminal 320C, a supplementary module-side signal connector terminals 326U a supplementary module-side connector terminals 326L are disposed side-by-side in a single row. On the side of the connecting area 370 where the primary sealed module assembly 302 is present, an element-side DC positive connector terminal 315D, an element-side DC negative connector terminal 319D, an element-side AC connector terminal 320D, element-side signal connector terminals 327U and element-side signal connector terminals 327L are disposed side-by-side in a single row along a surface of the first sealing resin 348 taking a polyhedral shape. Such a structure whereby the groups of terminals are disposed each in a single row at the connecting area 370 facilitates production of the primary sealed module assembly 302 through the use of a transfer mold.

The positional relationships among various terminals each representing a specific type of terminal and formed with a portion of the primary sealed module assembly 302 extending beyond the first sealing resin 348 will be described next. In the following description, a term "positive pole-side terminal" will be used to refer to a terminal configured with the DC positive wiring 315A (including the DC positive terminal 315B and the supplementary module-side DC positive connector terminal 315C) and the element-side DC positive connector terminal 315D, a term "negative pole-side terminal" will be used to refer to a terminal configured with the DC negative wiring 319A (including the DC negative terminal 319B and the supplementary module-side DC negative connector terminal 319C) and the element-side DC negative connector terminal 315D, a term "output terminal" will be used to refer to a terminal configured with the AC wiring 320A (including the AC terminal 320B and the supplementary module-side AC connector terminal 320C) and the element-side AC connector terminal 320D, a term "upper arm signal terminal" will be used to refer to a terminal configured with the signal wirings 324U (including the signal terminals 325U and the supplementary module-side signal connector terminals 326U) and the element-side signal connector terminals 327U, and a term "lower arm signal terminal" will be used to refer to a terminal configured with the signal wirings 324L (including the signal terminals 325L and the supplementary module-side signal connector terminals 326L) and the element-side signal connector terminals 327L.

The terminals listed above all project out from the first sealing resin 348 and the second sealing resin 351 through the connecting area 370, and the portions thereof projecting out from the first sealing resin 348 (i.e., the element-side DC positive connector terminal 315D, the element-side DC negative connector terminal 319D, the element-side AC connector terminal 320D, the element-side signal connector terminals 327U and the element-side signal connector terminals 327L) are set in a single row along one surface of the first sealing resin 348 assuming a polyhedral shape as has been described earlier. In addition, the positive pole-side terminal and the negative pole-side terminal project out in a laminated state from the second sealing resin 351 and range out beyond the module case 304. This structure makes it possible to prevent any excess stress occurring at the areas where the power semiconductor elements and the terminals are connected and also prevent formation of voids in the die during the die closing process while manufacturing the primary sealed module assembly 302 by sealing the power semiconductor elements with the first sealing resin 348. In addition, since the electric currents flowing along opposite directions at the positive pole-side terminal and the negative pole-side terminal laminated over each other generate magnetic fluxes along directions in which they negate each other, lower inductance is achieved.

On the side where the supplementary module 600 is present, the supplementary module-side DC positive connector terminal 315C and the supplementary module-side DC negative connector terminal 319C are respectively formed at the front ends of the DC positive wiring 315A and the DC negative wiring 319A, located on the side opposite from the side where the DC positive terminal 315B and the DC negative terminals 319B are present. In addition, the supplementary module-side AC connector terminal 320C is formed at the front end of the AC wiring 320A on the side opposite from the side where the AC terminal 320B is located. The supplementary module-side signal connector terminals 326U and 326L are respectively formed at the front ends of the signal wirings 324U and 324L on the side opposite from the side where the signal terminals 325U and 325L are located.

On the side where the primary sealed module assembly 302 is located, the element-side DC positive connector terminal 315D, the element-side DC negative connector terminal 319D and the element-side AC connector terminal 320D are respectively formed at the conductor plates 315, 319 and 320. In addition, the element-side signal connector terminals 327U and 327L are respectively connected with the IGBT 328 and the IGBT 330 through bonding wires 371. As shown in FIG. 10, the DC positive pole-side conductor plate 315, the AC output-side conductor plate 320 and the element-side signal connector terminals 327U and 327L, connected to a common tie-bar 372, are processed together so that they are all disposed on a substantially common plane. The collector electrode of the upper arm-side IGBT 328 and the cathode electrode of the upper arm-side diode 156 are bonded to the conductor plate 315. The collector electrodes of the lower arm-side IGBT 330 and the cathode electrode of the lower arm-side diode 166 are bonded to the conductor plate 320. The conductor plate 318 and the conductor plate 319 are disposed so as to sit on a substantially common plane over the IGBTs 328 and 330 and the diodes 155 and 166. The emitter electrode of the upper arm-side IGBT 328 and the anode electrode of the upper arm-side diode 156 are bonded to the conductor plate 318. The emitter electrode of the lower arm-side IGBT 330 and the anode electrode of the lower arm-side diode 166 are bonded to the conductor plate 319. The various power semiconductor elements are each bonded to an element bonding portion 322 at the corresponding conductor plate via a metal junction member 160. The metal junction members 160 may be constituted with, for instance, solder, silver sheet or a low-temperature sintered junction material containing fine metal particles. Each power semiconductor element has a flat plate-like shape, with the electrodes formed at the front and the rear surfaces thereof. As FIG. 10 indicates, the electrodes at the power semiconductor elements are held between the conductor plate 315 and the conductor plate 318 or between the conductor plate 320 and the conductor plate 319. Namely, the conductor plate 315 and the conductor plate 318 are disposed so as to achieve a laminated structure formed with the conductor plates facing opposite each other and substantially parallel to each other via the IGBT 328 and the diode 156. Likewise, the conductor plate 320 and the conductor plate 319 are disposed so as to achieve a laminated structure formed with the conductor plates facing opposite each other and substantially parallel to each other via the IGBT 330 and the diode 166. In addition, the conductor plate 320 and the conductor plate 318 are connected via an intermediate electrode 329. Through this connection, the upper arm circuit and the lower arm circuits are electrically connected, thereby forming an upper arm/lower arm serial circuit. As explained earlier, the IGBT 328 and the diode 156 are held between the conductor plate 315 and the conductor plate 318, the IGBT 330 and the diode 166 are held between the conductor plate 320 and the conductor plate 319, and the conductor plate 320 and the conductor plate 318 are connected via the intermediate electrode 329. Subsequently, control electrodes 328A at the IGBT 328 are connected to the element-side signal connector terminals 327U via the bonding wires 371, and control electrodes 330A at the IGBT 330 are connected to the element-side signal connector terminals 327L through the bonding wires 371.

Figure 11:
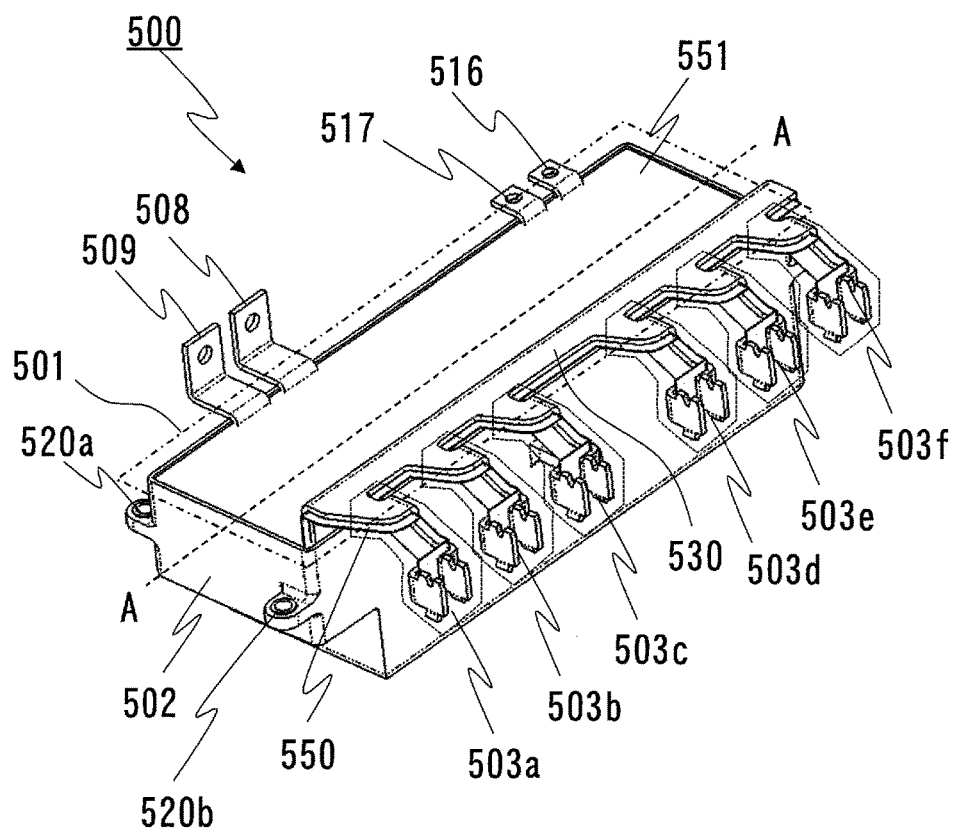
FIG. 11(b) An exploded perspective showing the internal structure of the capacitor module 500
Figure 11:
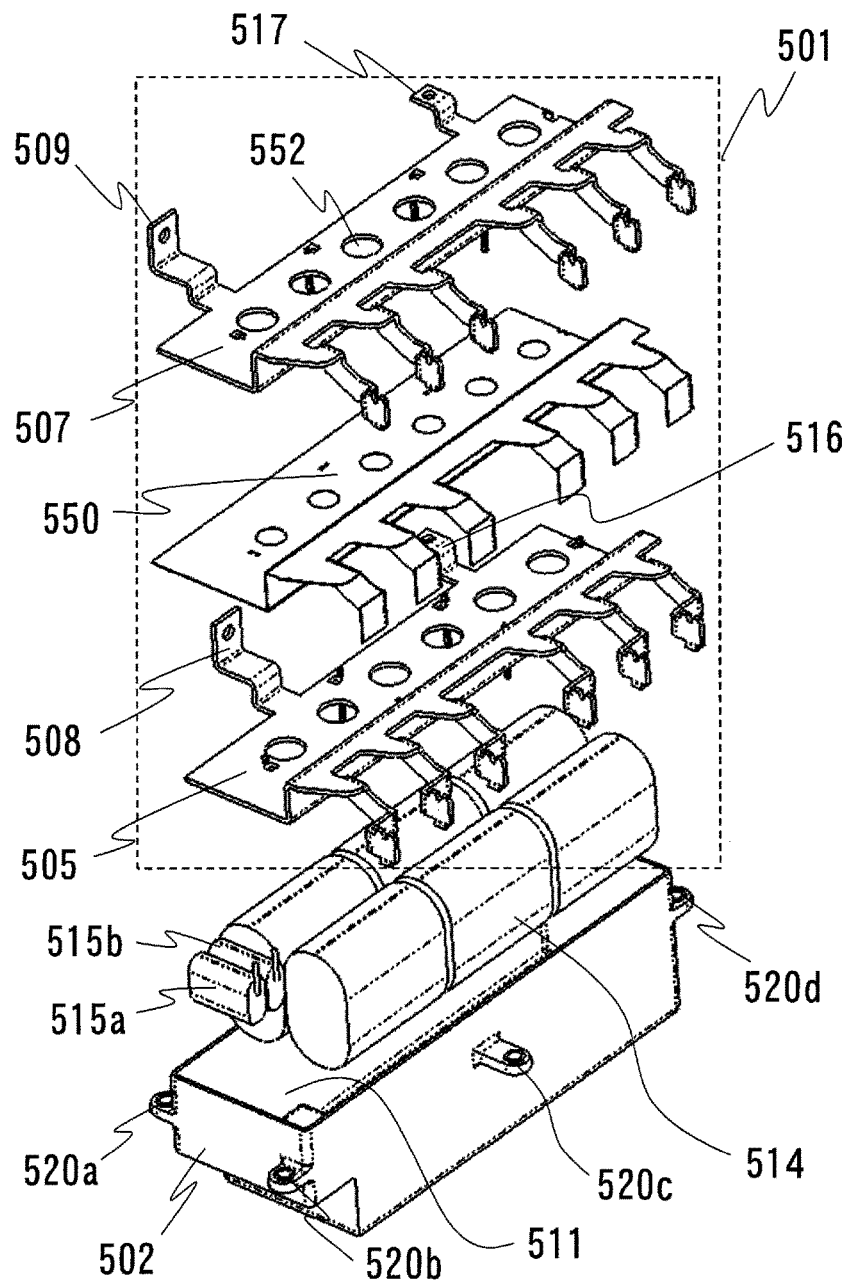

FIG. 11(a) shows the capacitor module 500 in a perspective. FIG. 11(b) is an exploded perspective showing the internal structure of the capacitor module 500. A laminated conductor plate 501 is constituted with a negative conductor plate 505 and a positive conductor plate 507, each formed with a wide plate-form conductor, with an insulating sheet 550 held between the negative conductor plate 505 and the positive conductor plate 507. The electric currents running through the upper arm/lower arm serial circuit 150 corresponding to each phase flow along directions opposite from each other at the negative conductor plate 505 and the positive conductor plate 507. This means that the magnetic fluxes generated at the laminated conductor plate 501 cancel or negate each other, thereby achieving lower inductance with regard to the electric currents flowing through the upper arm/lower arm serial circuit 150.

The negative pole-side source terminal 508 and the positive pole-side source terminal 509 are formed so as to stand from one of the longer sides of the laminated conductor plate 501. The negative pole-side source terminal 508 is connected to the negative conductor plate 505, whereas the positive pole-side source terminal 509 is connected to the positive conductor plate 507. Auxiliary capacitor terminals 516 and 517 are formed so as to stand from one of the longer sides of the laminated conductor plate 501. The auxiliary capacitor terminal 516 is connected to the negative conductor plate 505, whereas the auxiliary capacitor terminal 517 is connected to the positive conductor plate 507.

A relay conductor portion 530 is formed so as to stand from the other longer-side of the laminated conductor plate 501. Capacitor terminals 503a through 503c, projecting out from an end of the relay conductor portion 530, are formed respectively in correspondence to the power semiconductor modules 300a through 300c. In addition, capacitor terminals 503d through 503f, also projecting out from the end of the relay conductor portion 530, are formed respectively in correspondence to the power semiconductor modules 301a through 301c. The relay conductor portion 530 and the capacitor terminal 503a through 503f are all constituted with a laminate with an insulating sheet 550 inserted therein and thus, lower inductance is achieved with regard to the electric currents flowing through the upper arm/lower arm serial circuits 150.

In addition, the relay conductor portion 530 assumes a structure with no through holes or very few through holes formed therein, since the presence of through holes would hinder smooth flow of electric current.

The structure described above allows reflux currents, which are generated among the power semiconductor modules 300a through 300c or among the power semiconductor modules 300d through 300f installed in correspondence to the individual phases, to readily flow to the relay conductor portion 530 instead of flowing to the laminated conductor plate 501 during switching operation. As a result, the amount of heat generated at the laminated conductor plate 501 by reflux currents can be reduced.

It is to be noted that the negative conductor plate 505 or the positive conductor plate 507, the battery negative pole-side terminal 508 or the battery positive pole-side terminal 509, the relay conductor portion 530 and the capacitor terminals 503a through 503f are formed with a single-piece metal plate in the embodiment, thereby effectively reducing the inductance with regard to the electric currents flowing through the upper arm/lower arm serial circuits 150.

A plurality of capacitors cells 514 are disposed further downward relative to the laminated conductor plate 501. The positional arrangement with which the plurality of capacitor cells 514 are disposed will be described later in reference to FIG. 12. In addition, noise filtering capacitor cells 515a and 515b are disposed at a side of the capacitor cells 514. The noise filtering capacitor cell 515a is connected to the positive conductor plate 507 so as to remove noise occurring between the positive pole and the ground. The noise filtering capacitor cell 515b is connected to the negative conductor plate 505 so as to remove noise occurring between the negative pole and the ground. The capacity of the noise filtering capacitor cells 515a and 515b is set smaller than that of the capacitor cells 514.

Figure 12:
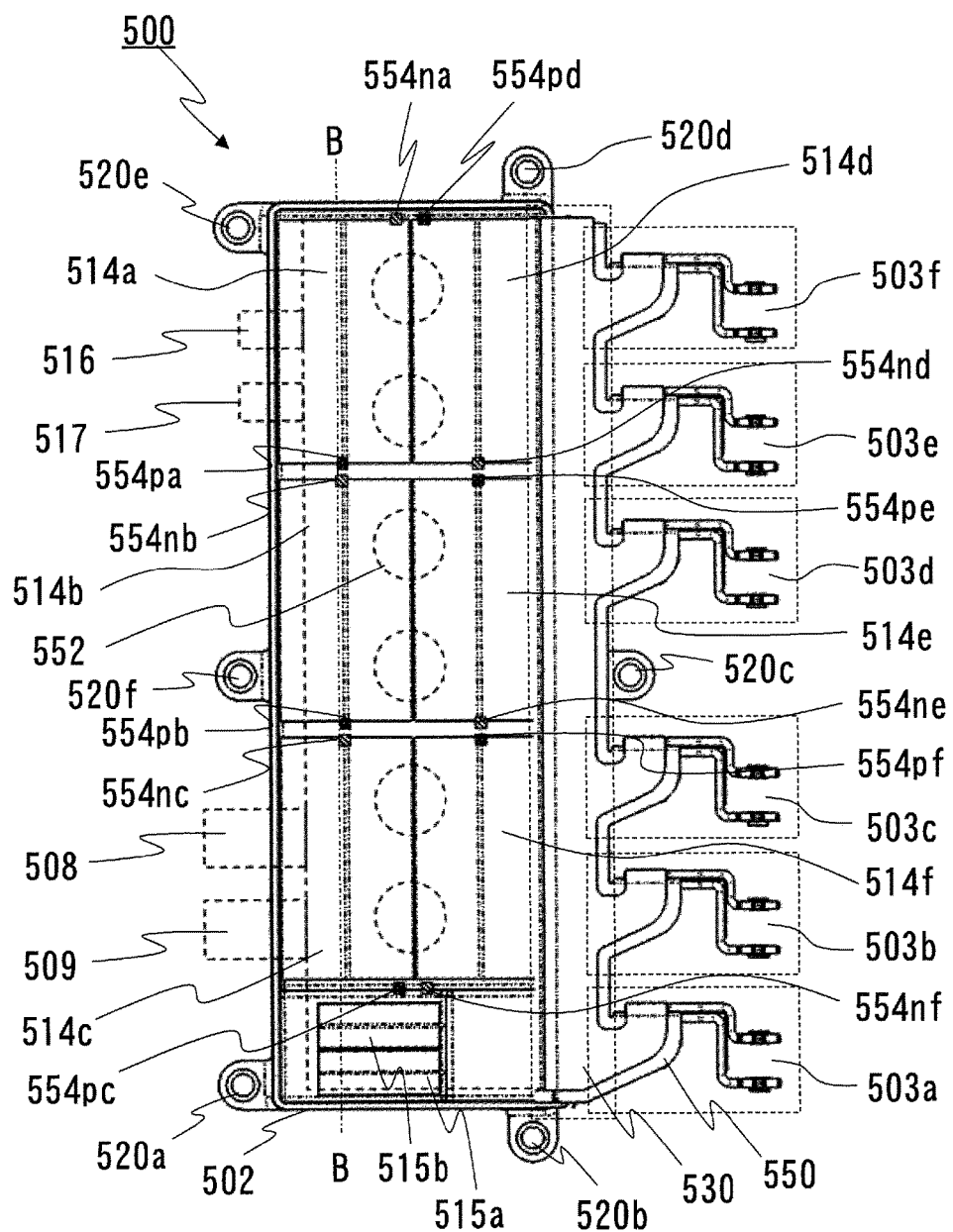
FIG. 12 A top view of the capacitor module 500, indicating the positions at which the capacitor cells 514 and the laminated conductor plate 501 are connected FIG. 13 A sectional view of the capacitor module 500 through the B-B plane in FIG. 12

FIG. 12 is a top view of the capacitor module 500, illustrating the connecting positions at which the capacitor cells 514 and the laminated conductor plate 501 are connected. In the embodiment, three capacitor cells 514a through 514c are disposed in a single row running along one of the longer sides of the laminated conductor plate 501, and three more capacitor cells 514d through 514f are disposed in a single row running along the other longer-side of the laminated conductor plate 501 for a total of 6 capacitor cells. Namely, the capacitor cells 514a through 514c are disposed on one side of the dotted line A-A, with the capacitor cells 514d through 514f disposed on the other side of the dotted line A-A.

Thus, when providing DC currents having been smoothed at the capacitor cells 514 to the power semiconductor modules 300a through 300c and the power semiconductor modules 301a through 301c, a uniform current balance is achieved between the capacitor terminals 503a through 503c and the capacitor terminals 503d through 503f, making it possible to lower the inductance at the laminated capacitor plate 501. In addition, since a localized flow of electric current through the laminated conductor plate 501 is prevented, a uniform thermal balance is achieved, which, in turn, makes it possible to improve the heat withstanding performance.

A positive pole-side capacitor electrode 553p is disposed on one side of each capacitor cell 514. On the side opposite from the side where the positive pole-side capacitor electrode 553p is disposed, a negative pole-side capacitor electrode 553n is disposed. For instance, a positive pole-side capacitor electrode 553pa and a negative pole-side capacitor electrode 553pa are disposed at the capacitor cell 514a (see FIG. 13).

In addition, a lead terminal 554n is connected to the negative pole-side capacitor electrode 553n. A lead terminal 554p is connected to the positive pole-side capacitor electrode 553p. For instance, a lead terminal 554pa is connected to the positive pole-side capacitor electrode 553pa at the capacitor cell 514a. A lead terminal 554na is connected to the negative pole-side capacitor electrode 553na at the capacitor cell 514a. Likewise, lead terminals 554pb and 554nb are connected to the capacitor cell 514b, as shown in FIG. 12. Lead terminals 554pc and 554nc are connected to the capacitor cell 514c. Lead terminals 554pd and 554nd are connected to the capacitor cell 514d. Lead terminals 554pe and 554ne are connected to the capacitor cell 514e. Lead terminals 554pf and 554nf are connected to the capacitor cell 514f. The lead terminal 554pa is disposed so that the direction along which the lead terminal 554pa and the lead terminal 554nb are disposed runs parallel to the direction along which the capacitor cell 514a and the capacitor cell 514b are disposed side-by-side. The lead terminal 554pb is disposed so that the direction along which the lead terminal 554pb and the lead terminal 554nc are disposed runs parallel to the direction along which the capacitor cell 514b and the capacitor cell 514c are disposed side-by-side. The lead terminal 554nd is disposed so that the direction along which the lead terminal 554nd and the lead terminal 554pe are disposed runs parallel to the direction along which the capacitor cell 514d and the capacitor cell 514e are disposed side-by-side. The lead terminal 554ne is disposed so that the direction along which the lead terminal 554ne and the lead terminal 554pf are disposed runs parallel to the direction along which the capacitor cell 514e and the capacitor cell 514f are disposed side-by-side.

The lead terminal 554na is disposed so that the connecting area where the lead terminal 554na is connected with the negative pole-side conductor 553na is set further toward the capacitor cell 514d relative to the central area of the negative pole-side conductor 553na. The lead terminal 554pc is disposed so that the connecting area where the lead terminal 554pc is connected with the positive pole-side conductor 553pc is set further toward the capacitor cell 514f relative to the central area of the positive pole-side conductor 553pc. The lead terminal 554pd is disposed so that the connecting area where the lead terminal 554pd is connected with the positive pole-side conductor 553pd is set further toward the capacitor cell 514a relative to the central area of the positive pole-side conductor 553pd. The lead terminal 554nf is disposed so that the connecting area where the lead terminal 554nf is connected with the negative pole-side conductor 553nf is set further toward the capacitor cell 514c relative to the central area of the negative pole-side conductor 553nf.

Figure 13:
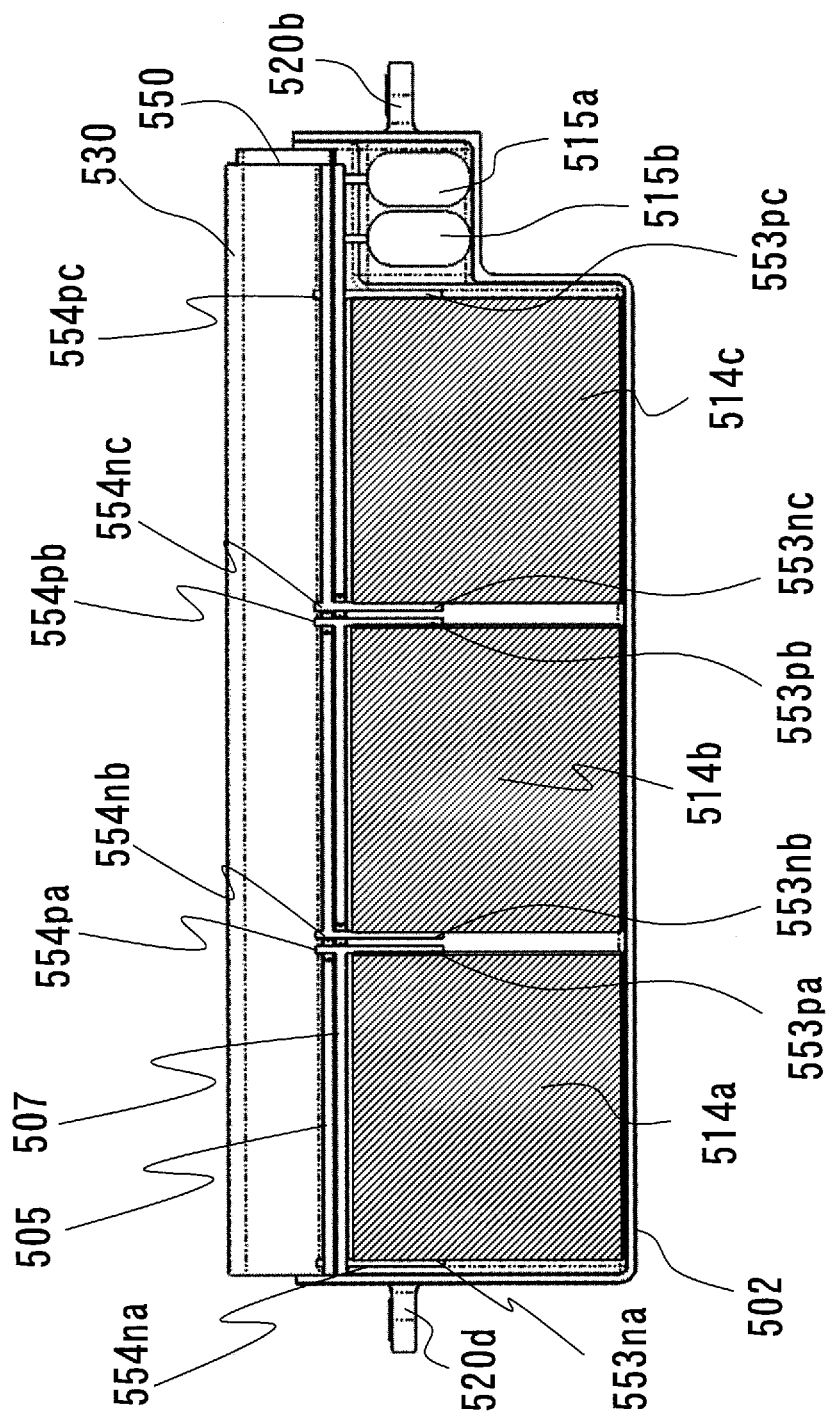

FIG. 13 is a sectional view of the capacitor module 500 taken through the B-B plane in FIG. 12. The capacitor cells 514 each configure a unit structural element for the power storage unit in the capacitor module 500, and are each constituted with a film capacitor formed by winding a laminate of two film sheets each having a metal such as aluminum vapor-deposited onto one surface thereof and designating one of the two metal-covered surfaces as a positive pole and the other metal-covered surface as a negative pole. The axial surfaces of the wound laminate, sprayed with a conductor such as tin, form the positive electrode 553p and the negative electrode 553n at the capacitor cell 514. In addition, the positive electrode 553p and the positive conductor plate 507 are connected through the positive pole-side lead terminal 554p. The negative electrode 553n and the positive conductor plate 505 are connected through the negative pole-side lead terminal 554n.

In the embodiment described above, the capacitor cell 514a and the capacitor cell 514b, for instance, are disposed so that the positive pole-side electrode 553pa at the capacitor cell 514a takes a position facing opposite the negative pole-side electrode 553nb of the capacitor cell 514b, closer to the negative pole-side electrode 553nb of the capacitor cell 514b than is the positive pole-side electrode 553pb of the capacitor cell 514b. In addition, the laminated plate 501 constituted with the positive conductor plate 507 and the negative conductor plate 505 continues or extends up to a point over the space where the positive pole-side electrode 553pa of the capacitor cell 514a and the negative pole-side electrode 553nb of the capacitor cell 514b face or face opposite each other. The positive pole-side electrode 553pa of the capacitor cell 514a is connected with the positive conductor plate 507 via the lead terminal 554pa. The negative pole-side electrode 553nb of the capacitor cell 514b is connected with the negative conductor plate 505 via the lead terminal 554nb. This positional arrangement makes it possible to achieve lower inductance by allowing the magnetic flux canceling or negating effect (the inductance reducing effect through mutual inductance) attributable to the same-phase bidirectional currents flowing in close proximity to each other to act over wide areas at the positive conductor plate 507 and the negative conductor plate 505.

In addition, a first row, defined as the row in which the capacitor cell 514a and the capacitor cell 514b are disposed, and a second row, defined as the row in which the capacitor cell 514d and the capacitor cell 514e are disposed, are set parallel to each other in the embodiment. The capacitor cell 514d is disposed so that the negative pole-side electrode 553nd of the capacitor cell 514d is set at a position facing opposite the positive pole-side electrode 553pe of the capacitor cell 514e, closer to the positive pole-side electrode 553pe of the capacitor cell 514e than is the negative pole-side electrode 553pe of the capacitor cell 514e. By adopting such a positional arrangement, the positive pole-side electrodes at the capacitor cells in the first row and the negative pole-side electrodes at the capacitor cells in the second row can be set in close proximity to each other and the negative pole-side electrodes at the capacitor cells in the first row and the positive pole-side electrodes at the capacitor cells in the second row can be set in close proximity to each other. Consequently, lower inductance, compared to the inductance in a configuration with positive pole-side electrodes set in close proximity to each other and the negative pole-side electrodes set in close proximity to each other, is achieved.

Furthermore, the embodiment adopts a positional arrangement whereby the negative pole-side lead terminal 554na of the capacitor cell 514a, for instance, is disposed so that the connecting area where the lead terminal 554na and the negative pole-side conductor 553na are connected with each other takes a position further toward the capacitor cell 514d relative to the center of the negative pole-side conductor 553na. The positive pole-side lead terminal 554pd of the capacitor cell 514d is disposed so that the connecting area where the lead terminal 554pd and the positive pole-side conductor 553pd are connected with each other takes a position further toward the capacitor cell 514a relative to the center of the positive pole-side conductor 553pd. This positional arrangement makes it possible to further enhance the magnetic flux canceling or negating effect attributable to the same-phase bidirectional currents flowing in close proximity to each other so as to achieve lower inductance with a higher level of reliability.

Moreover, a capacitor case 502 includes a housing portion 511 where the capacitor cells 514 are housed. The upper surface and the lower surface of the housing portion 511 assume a substantially rectangular shape. Holes 520a through 520f, through which locking means such as screws are inserted to lock the capacitor module 500 to the flow passage forming member 12, are formed at the capacitor case 502. While the capacitor case 502 in the embodiment is constituted of a resin having high thermal conductivity in order to improve heat transfer characteristics, it may instead be constituted of metal or the like.

In addition, once the laminated conductor plate 501 and the capacitor cells 514 are housed in the capacitor case 502, a filler material 551 is charged into the capacitor case 502 so as to cover the laminated conductor plate 501 alone without covering the capacitor terminals 503a through 503f, the negative pole-side source terminal 508 and the positive pole-side source terminal 509. With the through holes 552 formed as shown in FIG. 12 at the laminated conductor plate 501, the filler material 551 can be charged with ease.

Moreover, ripple currents occurring during switching operation cause heat generation at the capacitor cells 514 due to electrical resistance at the thin metal films vapor-deposited over the film sheets therein and at the internal conductors. Accordingly, in order to allow the heat generated at the capacitor cells 514 to be released readily via the capacitor case 502, the capacitor cells 514 are molded with the filler material 551. By using a filler material constituted of resin, the heat withstanding performance of the capacitor cells 514 can be improved, as well.

In the embodiment, the seventh flow passage portion 19g is formed so as to run along the longer sides of the housing portion 511 of the capacitor module 500 (see FIG. 5) and thus, the cooling efficiency is improved. In addition, the capacitor cells 514 are each disposed so that one of the electrode surfaces of the capacitor cell 514 is oriented to face toward the inner wall forming a shorter side of the housing portion 511 instead of facing toward one of the longer sides of the housing portion 511. The inner walls forming the longer sides of the housing portion 511 are formed so as to face toward the second flow passage portion 19b, the third flow passage portion 19c, the fourth flow passage portion 19d, the fifth flow passage portion 19e and the sixth flow passage portion 19f.

In addition, the noise filtering capacitor cells 515a and 515b are disposed at positions closer to the negative pole-side source terminal 508 and the positive pole-side source terminal 509 than is the capacitor terminals 503a through 503f. This positional arrangement makes it possible to eliminate specific noise entering the negative pole-side source terminal 508 and the positive pole-side source terminal 509 at an early stage so as to minimize the adverse effect of noise on the power semiconductor modules.

Figure 14:
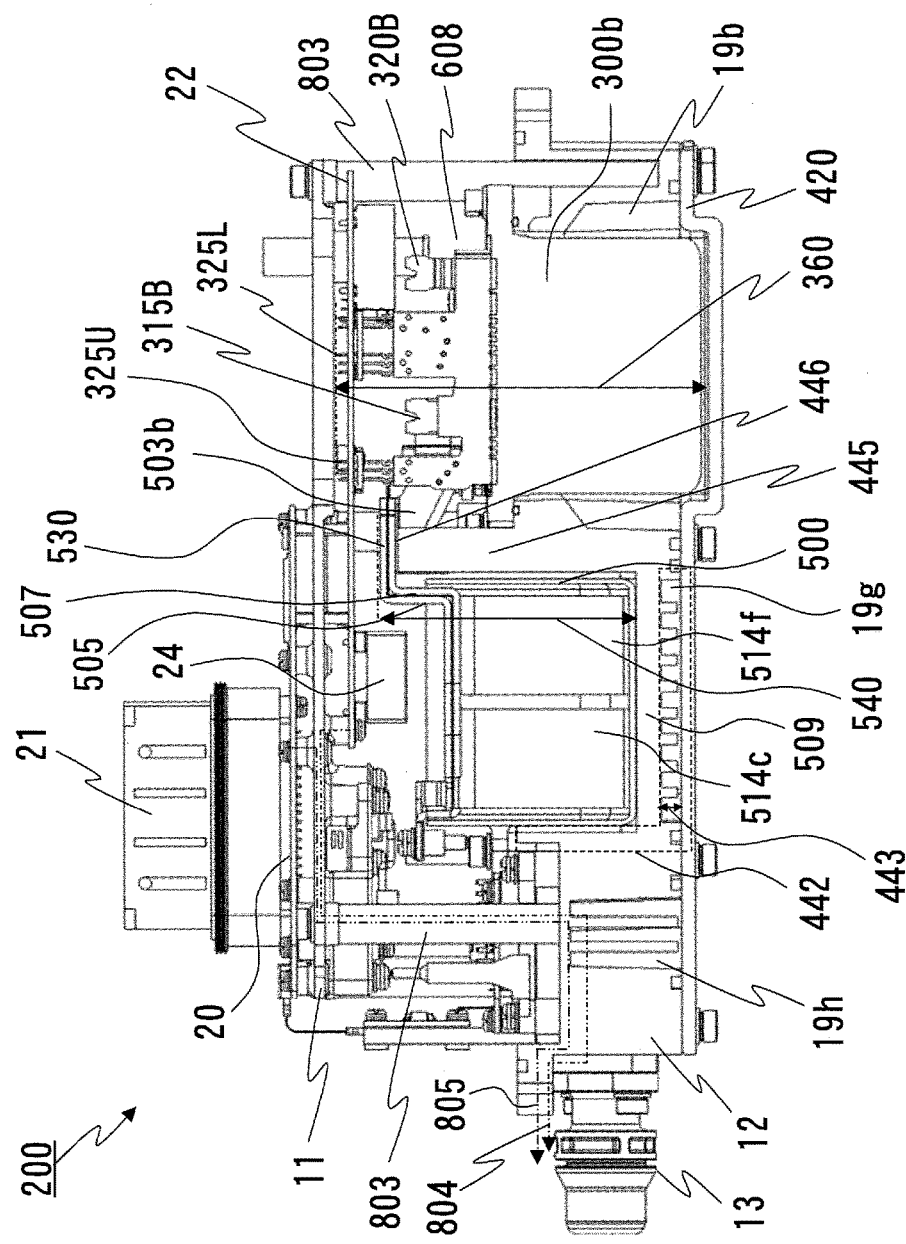
FIG. 14 A sectional view of the power conversion device 200 through the section A in FIG. 3

FIG. 14 is a sectional view of the power conversion device 200 through section A in FIG. 3.

The power semiconductor module 300b is inserted in the second flow passage portion 19b mentioned in reference to FIG. 5. The outer walls of the module case 304 are in direct contact with the coolant flowing through the second flow passage portion 19b. The other power semiconductor modules 300a, 300c and 301a through 301c, are also inserted through the corresponding flow passage portions, as is the power semiconductor module 300b.

The power semiconductor module 300b is disposed at a side of the capacitor module 500. The capacitor module is formed so as to achieve a height 540 smaller than a height 360 of the power semiconductor module. The height 540 of the capacitor module is measured from the bottom surface of the capacitor case 502 through the capacitor terminal 503b, whereas the height 360 of the power semiconductor module is measured from the bottom surface of the module case 304 through the ends of the signal terminals 325U.

The second flow passage forming member 442 forms the seventh flow passage portion 19g to take a position at the bottom of the capacitor module 500. Namely, the seventh flow passage portion 19g is disposed alongside the capacitor module 500 along the direction in which the height of the power semiconductor module 300b is measured. A height 443 of the seventh flow passage portion is smaller than the difference between the height 360 of the power semiconductor module and the height 540 of the capacitor module. It is to be noted that the height 443 of the seventh flow passage portion may be exactly equal to the difference between the height 360 of the power semiconductor module and the height 540 of the capacitor module.

By disposing the power semiconductor module 300b and the capacitor module 500 next to each other, the connection distance is reduced, which makes it possible to achieve lower inductance and a lesser extent of loss.

At the same time, since the power semiconductor module 300b and the capacitor module 500 can be locked and connected on the same plane, better ease of assembly is assured.

In addition, since the seventh flow passage portion 19g, is positioned at the bottom of the capacitor module 500 assuming the height 540 smaller than the height 360 of the power semiconductor module, the capacitor module 500 is also cooled. Furthermore, since the upper portion of the capacitor module 500 and the upper portion of the power semiconductor module 300b are positioned close to each other along the heightwise direction, the length of the capacitor terminal 503b, measured along the height of the capacitor module 500, can be minimized.

Since the seventh flow passage portion 19g is disposed at the bottom of the capacitor module 500 instead of at a side of the capacitor module 500, the capacitor module 500 and the power semiconductor module 300b can be set closer to each other so as to minimize the wiring distance between the capacitor module 500 and the power semiconductor module 300b.

Moreover, a transformer 24 that provides drive power for the driver circuits is mounted at the driver circuit board 22. This transformer 24 assumes a height greater than the heights of the circuit components mounted at the driver circuit board 22. The signal terminals 325U and the DC positive terminals 315B are disposed in the space formed between the driver circuit board 22 and the power semiconductor modules 300a through 300 and 301a through 301c. The transformer 24, on the other hand, is disposed in the space between the driver circuit board 22 and the capacitor module 500. This positional arrangement makes it possible to utilize the space between the driver circuit board 22 and the capacitor module 500 with a high level of efficiency. In addition, by mounting circuit components achieving a uniform height at the surface of the driver circuit board 22 located on the side opposite from the side at which the transformer 24 is disposed, the distance between the driver circuit board 22 and the metal base plate 11 can be minimized.

As FIG. 3 and FIG. 4 illustrate, the control circuit board 20 is disposed so as to face opposite one of the surfaces of the lid 8 where the first opening 202 is formed. In addition, the connector 21, which is directly mounted at the control circuit board 20, is made to project to the outside via the first opening 202 formed at the lid 8. As a result, the space available inside the power conversion device 200 can be utilized efficiently.

Furthermore, the control circuit board 20 with the connector 20 mounted thereat is locked to the metal base plate 11, and thus, even if a physical force is applied from an external source to the connector 20, the load to which the control circuit board 20 is subjected can be minimized, promising an improvement in reliability and durability.

Metal supporting members 803, connected to the flow passage forming member 12, project out from the flow passage forming member 12. The metal base plate 11 is supported at the front ends of the supporting members 803. The flow passage forming member 12 is electrically grounded. A leak current flow 804 indicates the direction along which a leak current flows from the driver circuit board 22 through the metal base plate 11, through the supporting members 803 and then through the flow passage forming member 12 in sequence. In addition, a leak current flow 805 indicates the direction along which a leak current flows from the control circuit board 20 through the metal base plate 11, through the supporting members 803 and then through the flow passage forming member 12 in sequence. Through these routes, leak currents at the control circuit board 20 and the driver circuit board 22 are directed to the ground efficiently.

Figure 15:
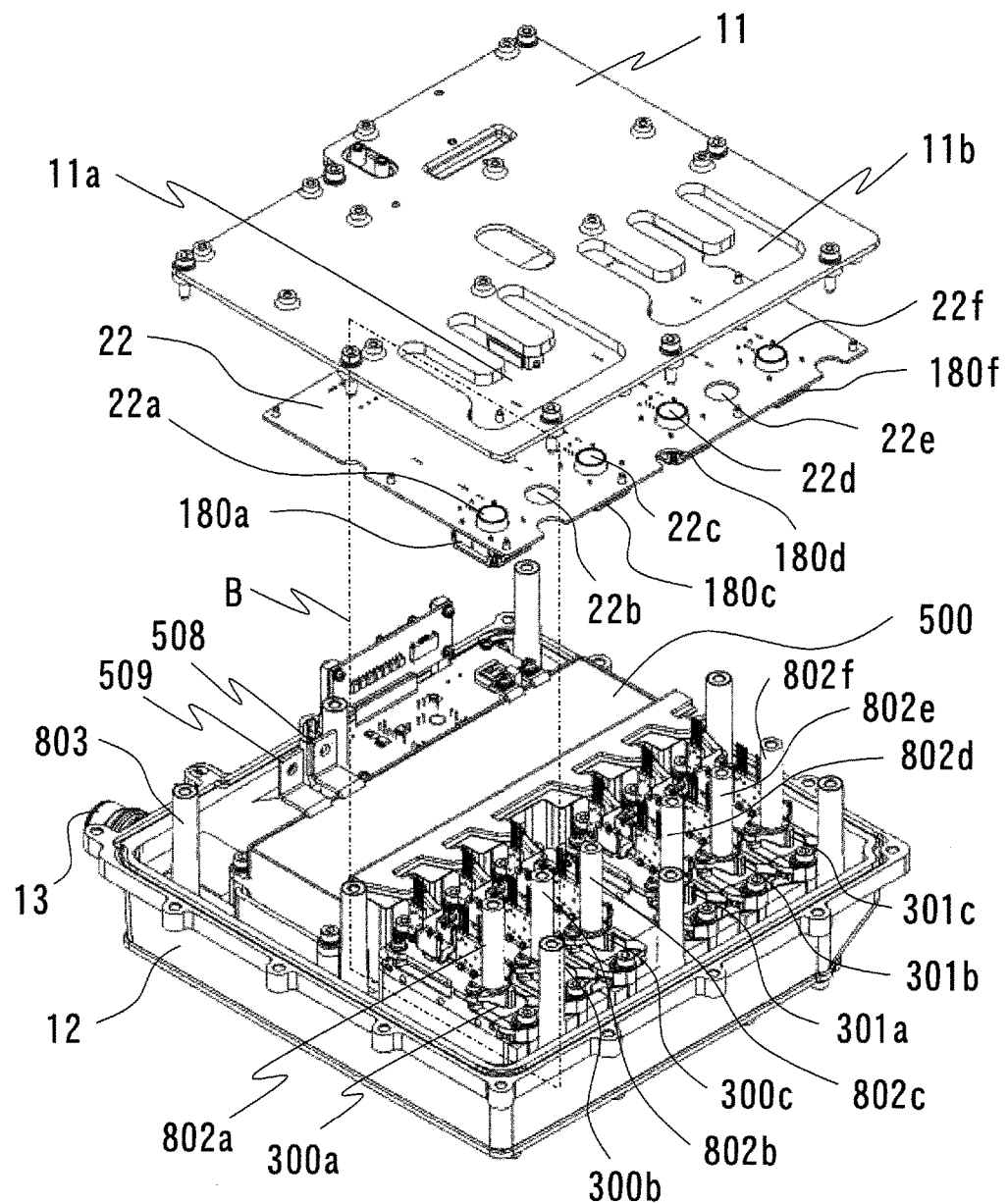
FIG. 15 An exploded perspective showing the driver circuit board 22 and the metal base plate 11 without the lid 8 and a control circuit board 20

FIG. 15 is a perspective without the lid 8 and the control circuit board 20, showing the driver circuit board 22 and the metal base plate 11 separated from each other.

The driver circuit board 22 is disposed atop the power semiconductor modules 300a through 300c and the power semiconductor modules 301a through 301c. The metal base plate 11 is disposed on the side of the driver circuit board 22 located opposite from the side where the power semiconductor modules 300a through 300c and the power semiconductor modules 301a through 301c are disposed.

At the driver circuit board 22, a through hole 22a at which the AC-side relay conductor 802a is inserted, a through hole 22b at which the AC-side relay conductor 802b is inserted, a through hole 22c at which the AC-side relay conductor 802c is inserted, a through hole 22d at which the AC-side relay conductor 802d is inserted, a through hole 22e at which the AC-side relay conductor 802e is inserted and a through hole 22f at which the AC-side relay conductor 802f is inserted are formed. It is to be noted that a current sensor 180a is fitted in the through hole 22a, a current sensor 180c is fitted in the through hole 22c, a current sensor 180d is fitted in the through hole 22d, and a current sensor 180f is fitted in the through hole 22f in the embodiment. However, a current sensor may be installed at each of the through holes 22a through 22f, instead.

The through holes 22a through 22f formed at the driver circuit board 22 allow current sensors to be directly disposed at the driver circuit board 22 and allow the wiring layout for the AC-side relay conductors 802a through 802f to be simplified, which ultimately is bound to contribute to further miniaturization.

In addition, the current sensor 180a and the like are disposed in the space between the driver circuit board 22 and the power semiconductor modules 300a through 300c and 301a through 301c. The power semiconductor modules 300a through 300c and the power semiconductor modules 301a through 301c include the DC positive terminals 315B and the like, and a sufficient insulation distance must be assured between terminals such as the DC positive terminals 315B and the driver circuit board 22.

The current sensor 180a and the like are disposed in the space formed to assure this insulation distance. Namely, the space inside the power conversion device is utilized both as an insulation space and an installation space for the current sensors, which allows further miniaturization of the power conversion device.

At the metal base plate 11, a through hole 11a is formed at a position facing opposite the through holes 22a through 22c and a through hole 11b is formed at a position facing opposite the through holes 22d through 22f. The AC connector 188 is configured by forming the third opening 204a at the lid 8 as shown in FIG. 3 at the position facing opposite the through hole 11a. The AC terminal 159 is configured by forming the fourth opening 204b at the lid 8 at the position facing opposite the through hole 11b.

Through these measures, even in the structure with the driver circuit board 22 disposed between the AC connector 188 and the power semiconductor modules 300a through 300c or between the AC terminal 159 and the power semiconductor modules 301a through 300c, the AC-side relay conductors 802a through 802f can be wired with a relatively simple wiring layout, which, in turn, contributes to further miniaturization of the power conversion device 200.

In addition, the power semiconductor modules 300a through 300c and 301a through 301c, viewed from above, take on a rectangular shape with longer sides and shorter sides. Likewise, the capacitor module 500 takes on a rectangular shape having longer sides and shorter sides. The power semiconductor modules 300a through 300c and 301a through 301c are disposed so that their shorter sides on one side are set side-by-side in single file along a longer side of the capacitor module 500. Since this positional arrangement allows the power semiconductor modules 300a through 300c to be disposed close to each other, the capacitor terminals 503a through 503, too, can be disposed close to each other, which makes it possible to hold down heat generated by reflux currents flowing through the power semiconductor modules 300a through 300c. A similar effect is also achieved with regard to the power semiconductor modules 301a through 301c.

Moreover, the through holes 22a through 22f are formed at the driver circuit board 22 along the direction in which the AC-side relay conductors 802a through 802f are disposed one after another. The driver circuit board 22 takes on a rectangular shape having a set of sides matching the longer sides of the capacitor module 500 and another set of sides, the length of which is equal to the sum of the length of the shorter sides of the capacitor module 500 and the length of the longer sides of the power semiconductor modules 300a through 300c and 301a through 301c.

While a plurality of through holes 22a through 22f are formed at the driver circuit board 22, these through holes 22a through 22f are all present along one side of the driver circuit board 22 and thus, a wide ranging circuit wiring area can be assured at the driver circuit board 22.

Figure 16:
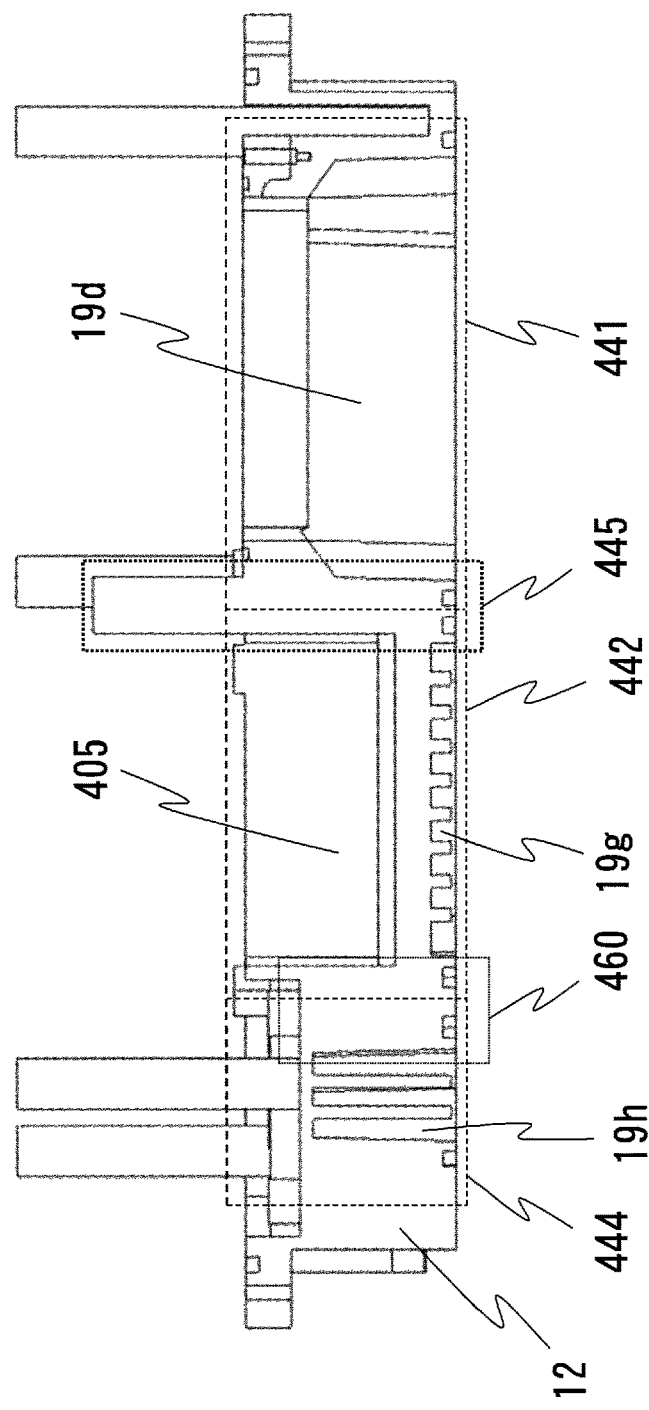
FIG. 16 A sectional view of the flow passage forming member 12 through the section C in FIG. 5

FIG. 16 is a sectional view taken through section C of the flow passage forming member 12 shown in FIG. 5. The flow passage forming member 12 is an integrated unit constituted with the first flow passage forming member 441 that forms the first flow passage portion 19a through the sixth flow passage portion 19f and the second flow passage forming member 442 that forms the seventh flow passage portion 19g. The first flow passage forming member 441 is positioned beside the second flow passage forming member 442. The second flow passage forming member 442 forms the housing space 405, where the capacitor module 500 is housed above the seventh flow passage portion 19g. In addition, the flow passage forming member 12 has a wall 445 that forms a side wall defining the housing space 405 and part of the seventh flow passage portion 19g. Namely, the first flow passage portion 19a through the sixth flow passage portion 19f are formed at positions facing opposite the wall 445.

Thus, the capacitor module 500, which is cooled at its bottom surface through the seventh flow passage portion 19g, is also cooled at the side surface thereof ranging along the heightwise direction via the first flow passage portion 19a through the sixth flow passage portion 19f, and as a result, the capacitor module 500 is cooled more efficiently.

In addition, the wall 445 defines part of the housing space 405 and forms parts of the seventh flow passage portion 19g and the fourth flow passage portion 19d. Since housing space, which needs to be cooled, is partitioned with the wall 445, the capacitor module and the power semiconductor modules can be individually cooled in units of modules. As a result, either side of the partitioning wall can be selected as the housing space to be given priority for cooling.

The flow passage forming member 12 is an integrated unit that further includes the third flow passage forming member 444 that forms the eighth flow passage portion 19h in addition to the first flow passage forming member 441 and the second flow passage forming member 442. The third flow passage forming member 444 is disposed at a side of the second flow passage forming member 442. The flow passage forming member 12 has a wall 460 that forms a side wall defining the housing space 405 and part of the eighth flow passage portion 19h. Namely, the eighth flow passage portion 19h is formed at a position facing opposite the wall 460. Thus, the capacitor module 500, which is cooled at its bottom surface through the seventh flow passage portion 19g, is also cooled at the side surface thereof ranging along the heightwise direction via the eighth flow passage portion 19h and as a result, the capacitor module 500 is cooled more efficiently.

Since the flow passage forming member 12 is formed as an integrated unit that includes the third flow passage forming member 444, which forms the eighth flow passage portion 19h, further structural simplification is achieved.

Furthermore, the capacitor terminals 503a through 503f are formed so as to straddle the top of the wall 445, as shown in FIG. 14. This positional arrangement makes it possible to lessen the effect of heat transferred between the capacitor module and the power semiconductor modules.

It is to be noted that an insulating member 446, disposed at the upper end of the wall 445, comes in contact with the capacitor-side conductor plate 530, as shown in FIG. 14. As a result, the effect of heat transferred between the capacitor module and the power semiconductor modules can be further reduced.

Figure 17:
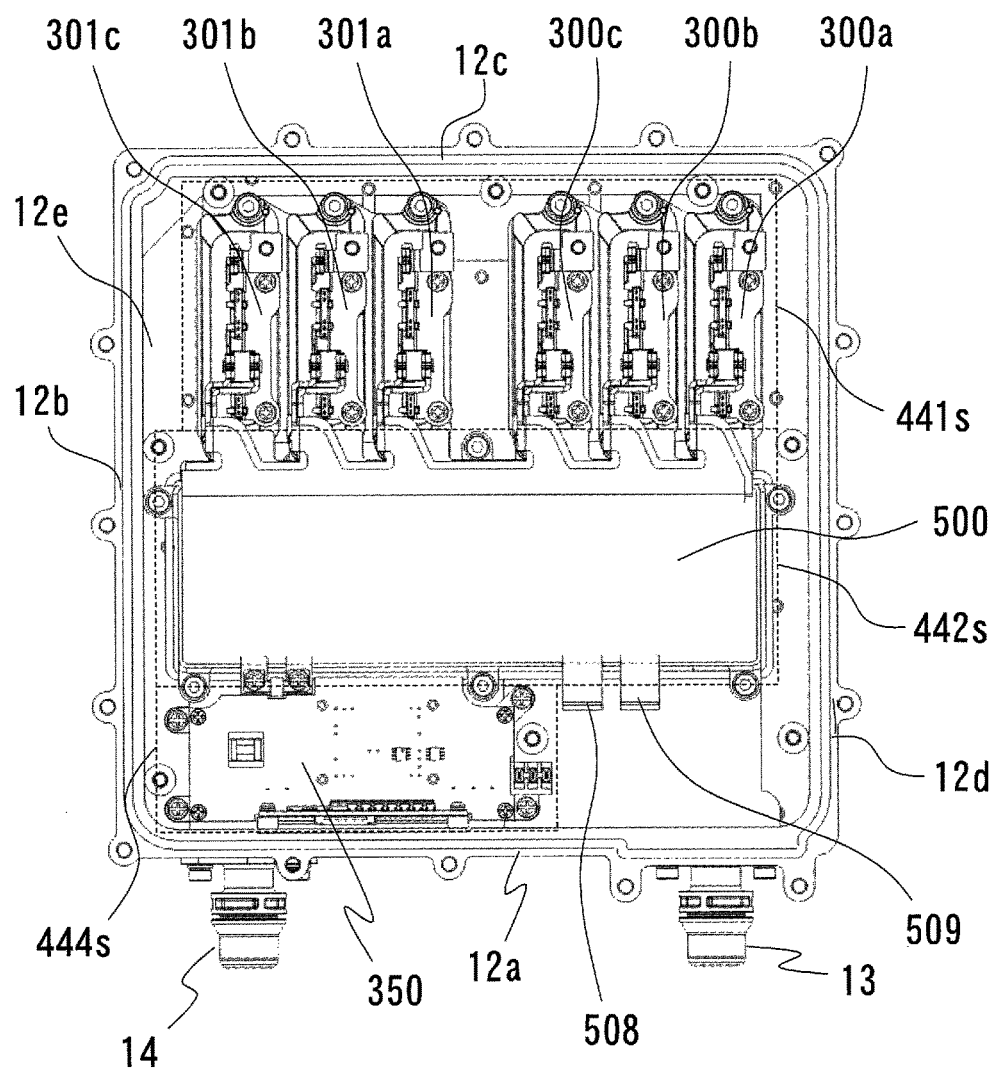
FIG. 17 A top view of the power conversion device 200 without the lid 8, the control circuit board 20, the metal base plate 11 and the driver circuit board 22

FIG. 17 is a top view of the power conversion device 200 without the lid 8, the control circuit board 20, the metal base plate 11 and the driver circuit boards 22.

A projection area 441s and a projection area 442s are respectively the projection area over which the first flow passage forming member 441 is projected and the projection area over which the second flow passage forming member 442 is projected with light cast from above the power conversion device 200, whereas a projection area 444s is the projection area over which the third flow passage forming member 444 is projected with the light. The auxiliary power module 350 is disposed so as to overlap the projection area 444s corresponding to the third flow passage forming member 444. The auxiliary power module 350 disposed as described above can be cooled with the cooling medium flowing through the eighth flow passage portion 19h.

In addition, the first flow passage forming member 441 and the second flow passage forming member 442 are disposed so as to face opposite a side wall 12b, a side wall 12c and a side wall 12d of the flow passage forming member 12 via an air gap 12e forming an air layer. Thus, even when there is a significant difference between the temperature of the cooling medium flowing through the first flow passage forming member 441 and the second flow passage forming member 442 and the outside temperature, the air gap 12e acts as a thermal insulating layer so that the first flow passage forming member 441 and the second flow passage forming member 442 are not readily influenced by the temperature outside the power conversion device 200.

REFERENCE SIGNS LIST

8: lid, 11: metal base plate, 11a and 11b: through hole, 12: flow passage forming member, 12a~12d: side wall, 12e: air gap, 13: intake pipe, 14: outlet pipe, 19a: first flow passage portion, 19b: second flow passage portion, 19c: third flow passage portion, 19d: fourth flow passage portion, 19e: fifth flow passage portion, 19f: sixth flow passage portion, 19g: seventh flow passage portion, 19h: eighth flow passage portion, 20: control circuit board, 21: connector, 22: driver circuit board, 22a~22f: through hole, 24: transformer, 120: AC terminal, 136: battery, 138: DC connector, 140: inverter circuit, 142: inverter circuit, 150: upper arm/lower arm serial circuit, 153: collector electrode, 154: gate electrode, 155: signal emitter electrode, 156: diode, 157: positive terminal, 158: negative terminal, 159: AC terminal, 163: collector electrode, 164: gate electrode, 165: signal emitter electrode, 166: diode, 168: intermediate electrode, 172: control circuit, 174: driver circuit, 180: current sensor, 180a~180f: current sensor, 188: AC connector, 195: auxiliary motor, 200: power conversion device, 202: first opening, 203: second opening, 204a: third opening, 204b: fourth opening, 205: fifth opening, 300a~300c: power semiconductor module, 301a~301c: power semiconductor module, 302: primary sealed module assembly, 304: module case, 304A: small wall thickness portion, 304B: flange, 305: fin, 306: insertion opening, 307A: first heat releasing surface, 307B: second heat releasing surface, 309: screw, 315: conductor plate, 315A: DC positive wiring, 315B: DC positive terminal, 315C: supplementary module-side DC positive connector terminal, 315D: element-side DC positive connector terminal, 318: conductor plate, 319: conductor plate, 319A: DC negative wiring, 319B: DC negative terminal, 319C: supplementary module-side DC negative connector terminal, 319D: element-side DC negative connector terminal, 320: conductor plate, 320A: AC wiring, 320B: AC terminal, 320C: supplementary module-side AC connector terminal, 320D: element-side AC connector terminal, 322: element bonding portion, 324U: signal wiring, 324L: signal wiring, 325L: signal terminal, 325U: signal terminal, 326L: supplementary module-side signal connector terminal, 326U: supplementary module-side signal connector terminal, 327L: element-side signal connector terminal, 327U: element-side signal connector terminal, 328: IGBT, 328A: control electrode, 329: intermediate electrode, 330: IGBT, 330A: control electrode, 333: insulating member, 348: first sealing resin, 350: auxiliary power module, 350A: driver circuit, 350B: inverter circuit, 351: second sealing resin, 360: power semiconductor module height, 370: connecting area, 371: bonding wire, 400a~400c, 402a~402c: opening, 404: opening, 405: housing space, 406a~406f: projecting portion, 407: cooling unit, 409: sealing member, 420: lower cover, 441: first flow passage forming member, 441s: projection area, 442: second flow passage forming member, 442s: projection area, 443: seventh flow passage portion height, 444: third flow passage forming member, 444s: projection area, 445: wall, 446: insulating member, 447 and 448: straight fin, 460: wall, 500: capacitor module, 501: laminated conductor plate, 502: capacitor case, 503a~503f: capacitor terminal, 504: negative pole-side capacitor terminal, 505: negative conductor plate, 506: positive pole-side capacitor terminal, 507: positive conductor plate, 508: negative pole-side source terminal, 509: positive pole-side source terminal, 510: negative pole-side power line, 511: housing portion, 512: positive pole-side power line, 514: capacitor cell, 514a~514f: capacitor cell unit, 515a and 515b: noise filtering capacitor cell, 516 and 517: auxiliary capacitor terminal, 520a~520f: hole, 530: relay conductor portion, 540: capacitor module height, 550: insulating sheet, 551: filler material, 552: through hole for filler charge, 553p: positive pole-side capacitor electrode, 553pa~553pf: positive pole-side capacitor electrode at individual capacitor cell, 553n: negative pole-side capacitor electrode, 553pa~553nf: negative pole-side capacitor electrode at individual capacitor cell, 554p: positive pole-side lead terminal, 554pa~554pf: positive pole-side lead terminal at individual capacitor cell, 554n: negative pole-side lead terminal, 554na~554nf: negative pole-side lead terminal at individual capacitor cell, 600: supplementary mold member, 608: wiring insulating member, 802a~802f: AC-side relay conductor, 803: supporting member, 804 and 805: leak current flow, DEF: differential gear, EGN: engine, MG 1: motor generator, MG 2: motor generator, TM: transmission, TSM: power transfer mechanism

The invention claimed is:

1. A capacitor module, comprising:
   a first capacitor element;
   a second capacitor element;
   a positive pole-side bus bar; and
   a negative pole-side bus bar disposed in a laminated state, in which the positive pole-side bus bar and the negative pole-side bus bar are laminated via an insulating member, wherein:
   the first capacitor element includes an electrically-conducting first capacitor cell where an electric charge is stored, a first positive pole-side electrode disposed on one side of the first capacitor cell, and a first negative pole-side electrode disposed on another side of the first capacitor cell so as to face the first positive pole-side electrode via the first capacitor cell;
   the second capacitor element includes a second capacitor cell where an electric charge is stored, a second positive pole-side electrode disposed on one side of the second capacitor cell, and a second negative pole-side electrode disposed so as to face the second positive pole-side electrode via the second capacitor cell;
   the first capacitor element is disposed so that the first positive pole-side electrode assumes a position closer to the second negative pole-side electrode than to the second positive pole-side electrode, and the first positive pole-side electrode and the second negative pole-side electrode are arranged in a line so that the first positive pole-side electrode directly overlaps the second negative pole-side electrode along a direction, perpendicular to a surface of the first positive pole-side electrode;
   a laminate portion formed with the positive pole-side bus bar and the negative pole-side bus bar continues up to a point over a space where the first positive pole-side electrode and the second negative pole-side electrode face each other,
   the first and second capacitor cells, including electrodes thereof, are covered directly by the laminated positive pole-side bus bar and the laminated negative pole-side bus bar.

2. The capacitor module according to claim 1, further comprising:
   a third capacitor element; and
   a fourth capacitor element, wherein:
   the third capacitor element includes a third capacitor cell where an electric charge is stored, a third positive pole-side electrode disposed on one side of the third capacitor cell, and a third negative pole-side electrode disposed so as to face the third positive pole-side electrode via the third capacitor cell;
   the fourth capacitor element includes a fourth capacitor cell where an electric charge is stored, a fourth positive pole-side electrode disposed on one side of the first capacitor cell, and a fourth negative pole-side electrode disposed so as to face the fourth positive pole-side electrode via the fourth capacitor cell;

the third capacitor element and the fourth capacitor element are disposed side-by-side in a second row extending parallel to a first row defining a direction in which the first capacitor element and the second capacitor element are disposed side-by-side;

the third capacitor element is disposed at a side of the first capacitor element;

the fourth capacitor element is disposed at a side of the second capacitor element; and the third capacitor element is disposed so that the third negative pole-side electrode assumes a position closer to the fourth positive pole-side electrode than to the fourth negative pole-side electrode and faces the fourth positive pole-side electrode.

3. The capacitor module according to claim 2, further comprising:

a first lead terminal connecting the first negative pole-side electrode of the first capacitor element with the negative pole-side bus bar; and a second lead terminal connecting the third positive pole-side electrode of the third capacitor element with the positive pole-side bus bar, wherein:

the first lead terminal is disposed so that a connecting area where the first lead terminal and the first negative pole-side electrode are connected is further toward to the third capacitor element relative to a center of the first negative pole-side electrode; and the second lead terminal is disposed so that a connecting area where the second lead terminal and the third positive pole-side electrode are connected is further toward the first capacitor element relative to a center of the third positive pole-side electrode.

4. The capacitor module according to claim 1, further comprising:

a first capacitor terminal via which a voltage smoothed by the first capacitor element and the second capacitor element is transmitted, wherein:

the first capacitor terminal is configured with a first positive pole-side capacitor terminal and a first negative pole-side capacitor terminal; and the first positive pole-side capacitor terminal and the first negative pole-side capacitor terminal are disposed so that a principal plane of the first positive pole-side capacitor terminal and a principal plane of the first negative pole-side capacitor terminal face each other.

5. The capacitor module according to claim 2, further comprising:

a sealing member that seals the first capacitor element, the second capacitor element, the third capacitor element, the fourth capacitor element, the positive pole-side bus bar and the negative pole-side busbar, wherein:

the positive pole-side bus bar or the negative pole-side bus bar forms a through hole between the first row and the second row.

6. A power conversion device comprising:

a capacitor module according to claim 4; and a power semiconductor module configuring an upper arm circuit and a lower arm circuit in an inverter circuit, wherein:

the power semiconductor module includes a positive pole-side terminal to connect with the first positive pole-side capacitor terminal and a negative pole-side terminal to connect with the first negative pole-side capacitor terminal; and a principal plane of the positive pole-side terminal faces a principal plane of the negative pole-side terminal.

7. The capacitor module according to claim 2, further comprising:

a first capacitor terminal via which a voltage smoothed by the first capacitor element and the second capacitor element is transmitted, wherein:

the first capacitor terminal is configured with a first positive pole-side capacitor terminal and a first negative pole-side capacitor terminal; and the first positive pole-side capacitor terminal and the first negative pole-side capacitor terminal are disposed so that a principal plane of the first positive pole-side capacitor terminal and a principal plane of the first negative pole-side capacitor terminal face each other.

8. The capacitor module according to claim 3, further comprising:

a first capacitor terminal via which a voltage smoothed by the first capacitor element and the second capacitor element is transmitted, wherein:

the first capacitor terminal is configured with a first positive pole-side capacitor terminal and a first negative pole-side capacitor terminal; and the first positive pole-side capacitor terminal and the first negative pole-side capacitor terminal are disposed so that a principal plane of the first positive pole-side capacitor terminal and a principal plane of the first negative pole-side capacitor terminal face each other.

9. The capacitor module according to claim 3, further comprising:

a sealing member that seals the first capacitor element, the second capacitor element, the third capacitor element, the fourth capacitor element, the positive pole-side bus bar and the negative pole-side busbar, wherein:

the positive pole-side bus bar or the negative pole-side bus bar forms a through hole between the first row and the second row.

10. A power conversion device comprising:

a capacitor module according to claim 7; and a power semiconductor module configuring an upper arm circuit and a lower arm circuit in an inverter circuit, wherein:

the power semiconductor module includes a positive pole-side terminal to connect with the first positive pole-side capacitor terminal and a negative pole-side terminal to connect with the first negative pole-side capacitor terminal; and a principal plane of the positive pole-side terminal faces a principal plane of the negative pole-side terminal.

11. A power conversion device comprising:

a capacitor module according to claim 8; and a power semiconductor module configuring an upper arm circuit and a lower arm circuit in an inverter circuit, wherein:

the power semiconductor module includes a positive pole-side terminal to connect with the first positive pole-side capacitor terminal and a negative pole-side terminal to connect with the first negative pole-side capacitor terminal; and a principal plane of the positive pole-side terminal faces a principal plane of the negative pole-side terminal.

12. The capacitor module according to claim 1, wherein the first and second capacitor elements are a film capacitor.

* * * * *